United States Patent
Lo et al.

(10) Patent No.: US 10,949,260 B2
(45) Date of Patent: Mar. 16, 2021

(54) EXECUTION TIME PREDICTION FOR ENERGY-EFFICIENT COMPUTER SYSTEMS

(71) Applicant: Cornell University, Ithaca, NY (US)

(72) Inventors: Daniel Lo, Ithaca, NY (US); Tao Chen, Ithaca, NY (US); Gookwon Edward Suh, Ithaca, NY (US); Taejoon Song, Ithaca, NY (US)

(73) Assignee: Cornell University, Ithaca, NY (US)

(*) Notice: Subject to any disclaimer, the term of this patent is extended or adjusted under 35 U.S.C. 154(b) by 173 days.

(21) Appl. No.: 15/781,339

(22) PCT Filed: Dec. 4, 2016

(86) PCT No.: PCT/US2016/064876
§ 371 (c)(1),
(2) Date: Jun. 4, 2018

(87) PCT Pub. No.: WO2017/096338
PCT Pub. Date: Jun. 8, 2017

(65) Prior Publication Data
US 2018/0321980 A1  Nov. 8, 2018

Related U.S. Application Data

(60) Provisional application No. 62/263,469, filed on Dec. 4, 2015.

(51) Int. Cl.
*G06F 9/48* (2006.01)
*G06F 9/50* (2006.01)
(Continued)

(52) U.S. Cl.
CPC .......... *G06F 9/5038* (2013.01); *G06F 9/4887* (2013.01); *G06F 9/5088* (2013.01);
(Continued)

(58) Field of Classification Search
CPC .... G06F 9/5038; G06F 9/4887; G06F 9/5088; G06F 11/3419; G06F 11/3644; G06F 2209/5019; G06N 7/005; Y02D 10/32
See application file for complete search history.

(56) References Cited

U.S. PATENT DOCUMENTS

| 7,174,536 B1 * | 2/2007 | Kothari ............... G06F 11/3664 |
| | | 717/105 |
| 2014/0040855 A1 | 2/2014 | Wang et al. |
| | | (Continued) |

OTHER PUBLICATIONS

Bitergen et al. Coordinated Management of Multiple Interacting Resources in Chip Multiprocessors: A Machine Learning Approach. [online] IEEE., pp. 318-329. Retrieved From the Internet <https://ieeexplore.ieee.org/stamp/stamp.jsp?arnumber=4771801> (Year: 2008).*

(Continued)

*Primary Examiner* — Emerson C Puente
*Assistant Examiner* — Jonathan R Labud
(74) *Attorney, Agent, or Firm* — Perkins Coie, LLP

(57) ABSTRACT

Methods, systems, and devices of using prediction-guided resource allocation technologies for software applications are disclosed, comprising generating a plurality of program features that impact execution time of a plurality of program tasks; predicting execution time of the plurality of program tasks on one or more computing cores using the plurality of program features, wherein each of the plurality of program features is mapped to an execution time estimate on a selected computing core; and con trolling resources for the one or more computing cores based on a predicted execution time of the plurality of program tasks.

21 Claims, 38 Drawing Sheets

(51) Int. Cl.
G06F 11/34 (2006.01)
G06F 11/36 (2006.01)
G06N 7/00 (2006.01)
(52) U.S. Cl.
CPC ...... *G06F 11/3419* (2013.01); *G06F 11/3644* (2013.01); *G06N 7/005* (2013.01); *G06F 2209/5019* (2013.01); *Y02D 10/00* (2018.01)

(56) References Cited

U.S. PATENT DOCUMENTS

| 2015/0117289 A1 | 4/2015 | Voigt et al. | |
|---|---|---|---|
| 2015/0293794 A1 | 10/2015 | Levin et al. | |
| 2016/0007899 A1* | 1/2016 | Durkee | A61B 5/0476 600/544 |
| 2016/0380908 A1* | 12/2016 | Larsson | G06F 9/5072 709/226 |

OTHER PUBLICATIONS

Zhang et al. A Cool Scheduler for Multi-Core Systems Exploiting Program Phases. [online] IEEE., pp. 1061-1073. Retrieved From the Internet <https://ieeexplore.ieee.org/stamp/stamp.jsp?arnumber=6365626> (Year: 2014).*

Chun et al. Mantis: Predicting System Performance through Program Analysis and Modeling. [online] pp. 1-14. (Year: 2010).*

Jaiantilal et al. Modeling CPU Energy Consumption for Energy Efficient Scheduling. [online] pp. 1-6. (Year: 2010).*

ODROID-XU3. http://www.hardkernel.com/main/ products/prdt_info.php?g_code=G140448267127.

"SHA cores." http://opencores.org/project,sha_core.

"AES (Rijndael) IP Core." http://opencores.org/project,aes_core.

"JPEG Decoder in Verilog." http://opencores.org/project,djpeg.

"Video compression systems." http://opencores.org/project,video_systems.

"Samsung Exynos Linux Kernel Drivers." https://github.com/hardkernel/linux/blob/odroidxu3- 3.10.y/arch/arm/mach-exynos/include/mach/exynos- mfc.h.

"Qualcomm Snapdragon 800 Product Brief." https://www.qualcomm.com/documents/snapdragon-800- processor-product-brief.

"Inside the Apple A7 from the iPhone 5s." http://www.chipworks.com/en/technical-competitive- analysis/resources/blog/inside-the-a7/.

"Chipworks Disassembles Apple's A8 SoC." http://www.anandtech.com/show/8562/chipworks-a8.

"Cortex-A7 Processor." http://www.arm.com/products/processors/cortex- a/cortex-a7.php.

ARM, "big.little technology: The future of mobile." http://www.arm.com/files/pdf/big_LITTLE_Technology_the_Future_of_Mobile.pdf, 2013.

Beldachi et al., "Run-time Power and Performance Scaling in 28 nm FPGAs," IET Computers & Digital Techniques, vol. 8, No. 4, pp. 178-186, 2014.

Benini et al., "Telescopic Units: A New Paradigm for Performance Optimization of VLSI Designs," IEEE Trans. on CAD of Integrated Circuits and Systems, vol. 17, No. 3,pp. 220-232, 1998.

Bernardelli, "Usage of algorithm of fast updates or QR decomposition to solution of linear regression models", in Electronic International Interdisciplinary Conference, 2012.

Brodowski, "CPU Frequency and Voltage Scaling Code in the LinuxTMKernel", https://android.googlesource.com/kernel/common/+/a7827a2a60218b25f222b54f77ed38f57aebe08b/Documentation/cpu-freq/governors.txt.

Card et al., "The Information Visualizer, an Information Workspace," in Proceedings of the SIGCHI Conference on Human Factors in Computing Systems, 1991.

Chen, "Execution Time Prediction for energy-Efficient Hardware Accelerators".

Chen et al., "Efficient Program Scheduling for Heterogeneous Multi-core Processors," in Proceedings of the 46th Annual Design Automation Conference, 2009.

Reagen et al., "MachSuite: Benchmarks for Accelerator Design andCustomized Architectures," in 2014 IEEE International Symposium on Workload Characterization, 2014.

Cho et al., "Benefits of the big.Little Architecture.," in Technical Report, Samsung Electronics Co., Ltd., 2012.

Choi et al., Frame-Based Dynamic Voltage and Frequency Scaling for a MPEG Decoder. In Proceedings of the IEEE/ACM International Conference on Computer Aided Design, 2002.

Clarke et al., "Program Slicing of Hardware Description Languages," in Conference on Correct Hardware Design and Verification Methods, 1999.

Cong et al., "Energy-efficient Scheduling on Heterogeneous Multicore Architectures," in Proceedings of the ACM/IEEE International Symposium on Low Power Electronics and Design, 2012.

Endo et al., "Using Latency to Evaluate Interactive System Performance" in Proceedings of the 2nd USENIX Symposium on Operating Systems Design and Implementation, 1996.

Godycki et al., "Enabling Realistic Fine-Grain Voltage Scaling with Reconfigurable Power Distribution Networks," in Proceedings of the 47th International Symposium on Microarchitecture, 2014.

Gu et al., "A Hybrid DVS Scheme for Interactive 3D Games", In Proceedings of the IEEE Real-Time and Embedded Technology and Applications Symposium, 2008.

Gu et al., "Control Theory-based DVS for Interactive 3D Games" In Proceedings of the 45th Annual Design Automation Conference, 2008.

Guthaus et al., "MiBench: A Free, Commercially Representative Embedded Benchmark Suite," Annual IEEE International Workshop on Workload Characterization, 2001.

Ham, "devfreq: Generic Dynamic Voltage and Frequency Scaling (DVFS) Framework for Non-CPU Devices", https://github.com/torvalds/linux/tree/master/drivers/devfreq.

Hammarling et al., "Updating the QR factorization and the least sqaures problem", in MIMS Report, 2008, p. 73.

Hsu et al., "Adrenaline: Pinpointing and Reining in Tail Queries with Quick Voltage Boosting", In Proceedings of the 21st IEEE Symposium on High Performance Computer Architecture, 2015.

Hugins-Daines, et al., "Pocketsphinx: A Free, Real-Time Continuous Speech Recognition System for Hand-Held Devices," in Proceedings of the IEEE International Conference on Acoustics, Speech and Signal Processing, 2006.

Ju et al., "A 0.5nJ/Pixel 4K H.265/HEVC Codec LSI for Multi-Format Smartphone Applications," in 2015 IEEE International Solid-State Circuits Conference, ISSCC 2015.

Kim et al., "A 1.22TOPS and 1.52mW/MHz Augmented Reality Multi-Core Processor with Neural Network NoC for HMD Applications," in 2014 IEEE International Solid-State Circuits Conference Digest of Technical Papers (ISSCC), 2014.

Kim et al., "System Level Analysis of Fast, Per-Core DVFS using On-chip Switching Regulators," in IEEE 14th International Symposium on High Performance Computer Architecture, 2008.

Kwon et al., "Mantis: Automatic Performance Prediction for Smartphone Applications," in Proceedings of the 2013 USENIX Conference on Annual Technical Conference, 2013.

Lindgaard et al., "Attention web designers: You have 50 milliseconds to make a good first impression!," Behavior & Information Technology, vol. 25, No. 2, 2006.

Lo et al., "Prediction-Guided Performance-Energy Trade-off for Interactive Applications" in Proceedings of the 48th International Symposium on Microarchitecture, 2015.

Lo et al., "Towards Energy Proportionality for Large-scale Latency-critical Workloads," in Proceeding of the 41st Annual International Symposium on Computer Architecuture, 2014.

Miftakhutdinov et al., Predicting Performance Impact of DVFS for Re-alistic Memory Systems. In Proceedings of the 45th Annual IEEE/ACM International Symposium on Microarchitecture, pp. 155-165, 2012.

Miller, "Response Time in Man-computer Conversational Transactions," in Proceedings of the 1968 Fall Joint Computer Conference, Part I, 1968.

(56) References Cited

OTHER PUBLICATIONS

Miller et al., "Booster: Reactive Core Acceleration for Mitigating the Effects of Process Variation and Application Imbalance in Low-Voltage Chips," in Proceedings of the 18th International Symposium on High Performance Computer Architecture, 2012.

Nachiappan et al., "Domain Knowledge Based Energy Management in Handhelds", In Proceedings of the 21st IEEE Symposium on High Performance Computer Architecture, 2015.

Nikolaev, "Curse of War—Real Time Strategy Game For Linux." https://github.com/a-nikolaev/curseofwar.

Park et al., "A 646GOPS/W Multi-Classifier Many-Core Processor with Cortex-Like Architecture for Super-Resolution Recognition," in 2013 IEEE International Solid-State Circuits Conference Digest of Technical Papers (ISSCC), 2013.

Petrucci, et al., "Octopus-Man: QoS-Driven Task Management for Heterogeneous Multicores in Warehouse-Scale Computers," in Proceedings of the 21st IEEE Symposium on High Performance Computer Architecture, 2015.

Pinckney et al., "Shortstop: An On-Chip Fast Supply Boosting Technique," in Proceedings of the 2013 Symposium on VLSI Circuits, 2013.

Plaetinck, "Uzbl—Web Interface Tools Which Adhere to the Unix Philosophy." http://www.uzbl.org.

Putnam et al., "A Reconfigurable Fabric for Accelerating Large-Scale Datacenter Services," in ACM/IEEE 41st International Symposium on Computer Architecture, 2014.

Roitzsch et al., "ATLAS: Look-Ahead Scheduling Using Workload Metrics," in Proceedings of the 19th IEEE Real-Time and Embedded Technology and Applications Symposium (RTAS), 2013.

Saha et al., "An Experimental Evaluation of Real-Time DVFS Scheduling Algorithms," in International Systems and Storage Conference (SYSTOR), 2012.

Shi et al., "A Highly Efficient Method for Extracting FSMs from FlattenedGate-level Netlist," in International Symposium on Circuits and Systems (ISCAS), 2010.

Shin et al., "Low-energy Intra-task Voltage Scheduling Using Static Timing Analysis," in Proceedings of the 38th Annual Design Automation Conference, 2001.

Song, "Prediction-Guided Performance-Energy Trade-off with Contunuous Run-Time Adaptation".

Srinivasan et al., "HeteroScouts: Hardware Assist for OS Scheduling in Heterogeneous CMPs," ACM SIGMETRICS Performance Evaluation Review, vol. 39, No. 1, 2011.

Stabell et al., "XPilot." http://www.xpilot.org/.

Suehring, "H.264/AVC Software Coordingation." http://iphome.hhi.de/suehring/tml/.

Sze et al., "0.7-V 1.8-mW H.264/AVC 720p Video Decoder", IEEE Journal of Solid-State Circuits, 44(11), pp. 2943-2956, 2009.

International Search Report and Written Opinion for PCT Application No. PCT/US2016/064876, dated May 5, 2017, 11 pages.

Tip, "A Survey of Program Slicing Techniques," Journal of Programming Languages, vol. 3, No. 3, 1995.

Van Craeynest et al., "Scheduling Heterogeneous Multi-cores Through Performance Impact Estimation (PIE)," in Proceedings of the 39th Annual International Symposium on Computer Architecture, 2012.

Van Der Schee, "2048.c." https://github.com/mevdschee/2048.c.

Weiser et al., "Scheduling for Reduced CPU Energy," in Proceedings of the 1st USENIX Conference on Operating Systems Design and Implementation, 1994.

Wilhelm et al., "The Worst-Case Execution-Time Problem—Overview of Methods and Survey of Tools," ACM Transactions on Embedded Computing Systems, 2008.

Wolf, "Yosys Open SYnthesis Suite." http://www.clifford.at/yosys/.

Wu et al., "A Dynamic Compilation Framework for Controlling Microprocessor Energy and Performance," in Proceedings of the 38th International Symposium on Microarchitecture, 2005.

Xie et al., "Compile-time Dynamic Voltage Scaling Settings: Opportunities and Limits", In Proceedings of the ACM SIGPLAN Conference on Programming Language Design and Implementation, 2003.

Xu et al., "Low-power H.264/AVC Baseline Decoder for Portable Applications," in Proceedings of the 2007 International Symposium on Low Power Electronics and Design, 2007.

Zhu et al., "Event-Based Scheduling for Energy-Efficient QoS (eQoS) in Mobile Web Applications", In Proceedings of the 21st IEEE Symposium on High Performance Computer Architecture, 2015.

Zhu et al., "High-performance and Energy-efficient Mobile Web Browsing on Big/Little Systems", In International Symposium on High-Performance Computer Architecture (HPCA), 2013.

\* cited by examiner

| Original Code | Instrumented Code |
|---|---|
| `if (condition) {`<br>`...`<br>`}` | `if (condition) {`<br>`    feature[0]++;`<br>`    ...`<br>`}` | Conditional |
| `for (i=0; i<n; i++) {`<br>`...`<br>`}`<br>`while (n = n->next) {`<br>`...`<br>`}` | `feature[1] += n;`<br>`for (i=0; i<n; i++) {`<br>`    ...`<br>`}`<br>`while (n = n->next) {`<br>`    feature[2]++;`<br>`    ...`<br>`}` | Loops |
| `(*func)();` | `(*func)();`<br>`feature[3] = func;` | Call |

FIG. 13

EXECUTION TIME PREDICTION FOR ENERGY-EFFICIENT COMPUTER SYSTEMS

CROSS-REFERENCE TO RELATED APPLICATIONS

This patent document is a 371 National Phase Application of PCT Application No. PCT/US2016/064876 entitled "EXECUTION TIME PREDICTION FOR ENERGY-EFFICIENT COMPUTER SYSTEMS", filed on Dec. 4, 2016, which claims benefit of priority of U.S. Provisional Patent Application No. 62/263,469 entitled "EXECUTION TIME PREDICTION FOR ENERGY-EFFICIENT COMPUTER SYSTEMS," filed on Dec. 4, 2015. The entire contents of the aforementioned patent applications are incorporated by reference as part of the disclosure of this patent document.

STATEMENT REGARDING FEDERALLY SPONSORED RESEARCH OR DEVELOPMENT

This invention was made with government support by the Office of Naval Research (ONR) under grant number N0014-15-1-12175 and by the Air Force Research Laboratory (AFRL) under grant number FA8750-11-2-0025. The government has certain rights in this invention.

TECHNICAL FIELD

This patent document relates to allocation of computing resources in a computing system.

BACKGROUND

Many applications on mobile, desktop, and cloud computing systems are highly interactive. Often these applications involve real-time user interactions and software tasks must complete within a certain amount of time for smooth user experience and satisfaction.

SUMMARY

This patent document discloses techniques, systems, and devices for implementing a prediction-guided resource allocation method for improving energy efficiency while meeting response-time requirement for both computer software and hardware. Features impacting execution time of the applications are identified and predictions of the corresponding execution time are generated by training and fitting a mathematical model. The technique can be applied to various resource allocation decisions. For example, appropriate clock frequency and voltage for computer software and hardware systems can selected based on the predicted execution time of the tasks. Tasks can also be allocated to different types of cores based on the prediction results.

In one example aspect, a method of using prediction-guided resource allocation technologies for software applications is disclosed. The method comprises generating a plurality of program features that impact execution time of a plurality of program tasks, predicting execution time of the plurality of program tasks on one or more computing cores using the plurality of program features, wherein each of the plurality of program features is mapped to an execution time estimate on a selected computing core; and controlling resources for the one or more computing cores based on the predicted execution time of the plurality of program tasks.

This method may be embodied in a computer program product comprising a computer-readable program medium having code stored thereon.

In another example aspect, an apparatus using prediction-guided resource allocation technologies for computer hardware systems is disclosed. The apparatus comprises a logic module including a control unit with one or more finite state machines for handling input requests and output responses and generating control signals and a data-path module for performing computation on input requests to generate output data and signals; one or more computing cores; and a prediction controller that records execution time of a plurality of features during training runs by Register Transfer Level (RTL) instrumentation and analysis, wherein the plurality of features impact execution time of a task associated with a deadline; predicts execution time of the task on the one or more computing cores using the plurality of features, wherein each of the plurality of feature is mapped to an execution time estimate on a selected computing core based on data from the training runs; and controls resources for the one or more computing core based on the predicted execution time of the task.

The above and other aspects and their implementations are described in greater detail in the drawings, the description and the claims.

BRIEF DESCRIPTION OF THE DRAWINGS

FIG. 13 shows examples of how control flow features are instrumented.

DETAILED DESCRIPTION

Many modern software applications executed on mobile and desktop systems are highly interactive. These applications are effectively soft real-time tasks that may have a user response-time deadline. The tasks should finish by the deadline for good user experience, but finishing faster does not necessarily improve the user experience due to the limits of human perception. Thus, for energy efficiency, tasks should be run just fast enough to meet the response-time requirement instead of wasting energy by running faster.

Power-performance trade-off techniques, such as dynamic voltage and frequency scaling (DVFS), can be used to reduce energy usage by the hardware platform while maintaining the same user experience. Existing techniques using DVFS are typically reactive, using past histories of task execution time as an estimate of future execution times. However, the execution time of a task can vary greatly depending on its input. Reactive controllers often cannot respond fast enough to input-dependent execution time variations. Instead, predictive control is useful to adjust the operating point of a task before it runs.

Figure 1:
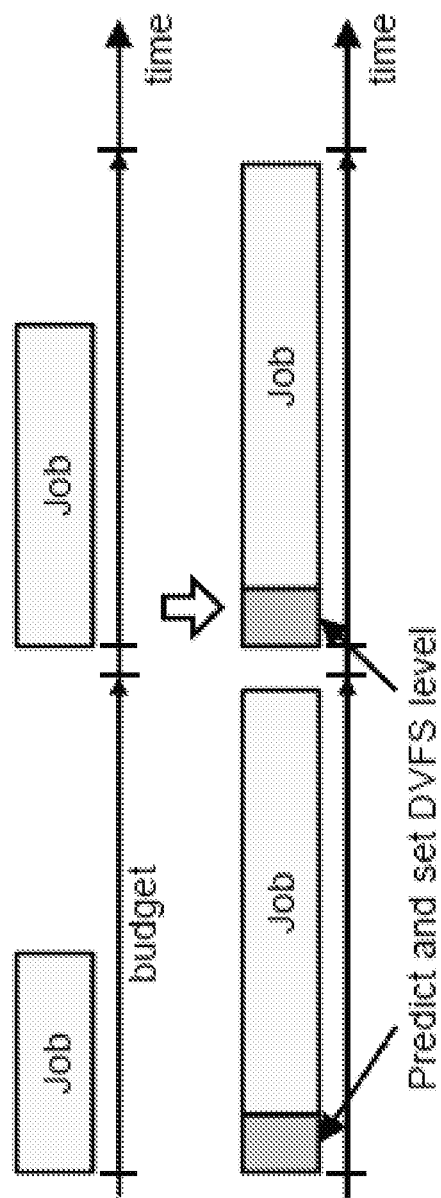
FIG. 1 shows an exemplary overview of prediction-based control.

This patent document discloses, among other things, an automated method for prediction-based DVFS controllers. FIG. 1 shows an exemplary overview of prediction-based control. In some embodiments, given a software application, this method can predict the appropriate DVFS level for each task execution, depending on its input and program state values, in order to satisfy response-time requirements. The method is applicable for software running on traditional computing units as well as dedicated hardware accelerators. Moreover, the method can intelligently select a computing core in a heterogeneous system to optimize task execution. It is notable that, while the term "computing core" is used to explain the disclosed technology, the applicability of the disclosed technology and the term "computing core" encompasses, and is not limited to, a computing unit, a central processor unit, a hardware accelerator, a microprocessor, and a logic circuit that is programmed to execute instructions.

Execution Time Variation in Interactive Applications

Tasks and Jobs

A task is defined as a portion of an application that has an associated response-time requirement. The time period in which a task must complete is referred to as its time budget. For example, games are typically written with a main task that handles reading user input, updating game state, and displaying the output. In order to maintain a certain frame rate (e.g., 30 frames per second), this task must finish within the frame period budget (e.g., 33 milliseconds for 30 frames per second operation).

Figure 2:
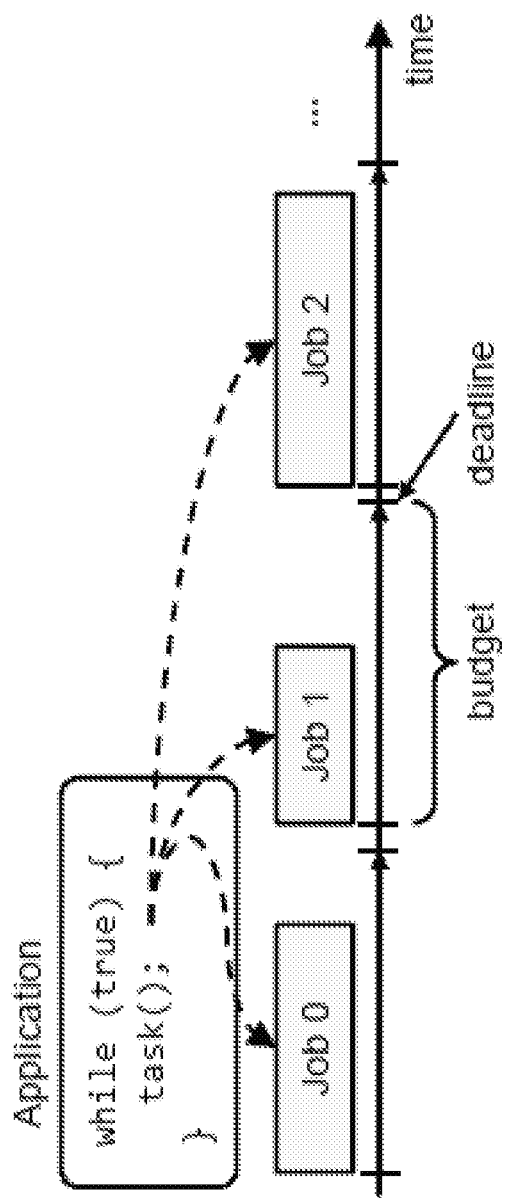
FIG. 2 shows exemplary concepts of tasks, jobs, and deadlines.

A job is defined as a dynamic instance of a task. As an illustrative example, FIG. 2 shows the concept of tasks, jobs, and deadlines in the software domain, wherein each job has a deadline, or a time budget, which is the time by which it must finish execution. FIG. 2 also shows how a task maps to multiple jobs. Each job has a deadline which is the time by which it must finish execution. For example, for a game running at 30 frames-per-second, 30 jobs for the game loop task are run each second. Each of these jobs has a deadline which is 33 milliseconds after the job's start time. These jobs all correspond to the same set of static task code, but their dynamic behavior differs due to different inputs and program state. For example, one job may see that the user has pressed a button and thus execute code to process this button press. Other jobs may see no new user input and skip the need to process user input. As a result, job execution times can vary depending on input and program state.

Figure 3:
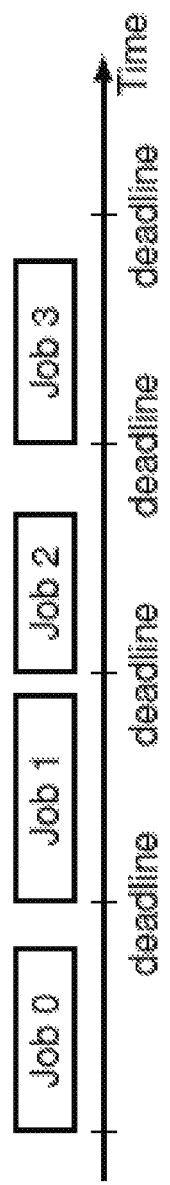
FIG. 3 shows an exemplary sequence of jobs for a task.

FIG. 3 shows an exemplary sequence of jobs for a task.

Execution Time Variation

The execution time for a task can vary from job to job. If they can be predicted, these execution time variations provide an opportunity to save energy using performance-energy trade-off techniques, without impacting user experience. For example, dynamic voltage and frequency scaling (DVFS) can be used to slow down a fast job in order to save energy. As long as the job still finishes by its deadline, then there will be no impact on user experience.

Figure 4:
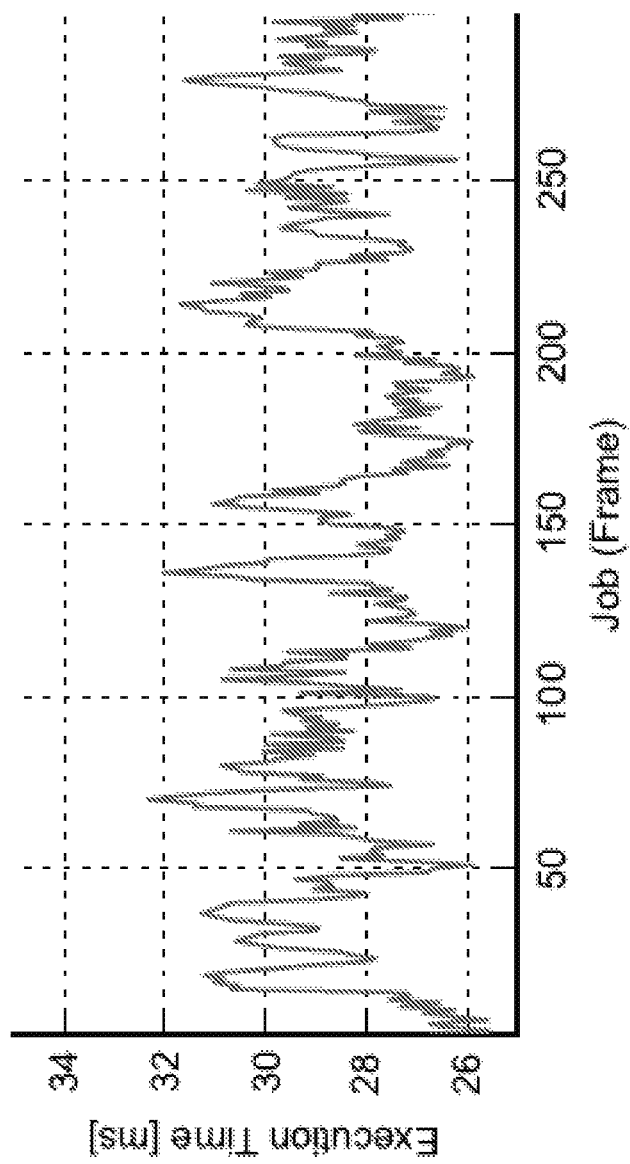
FIG. 4 shows an example of the execution time per job (frame) for a video decoder application (ldecode) running on an ODROID-XU3 development board.
Figure 5:
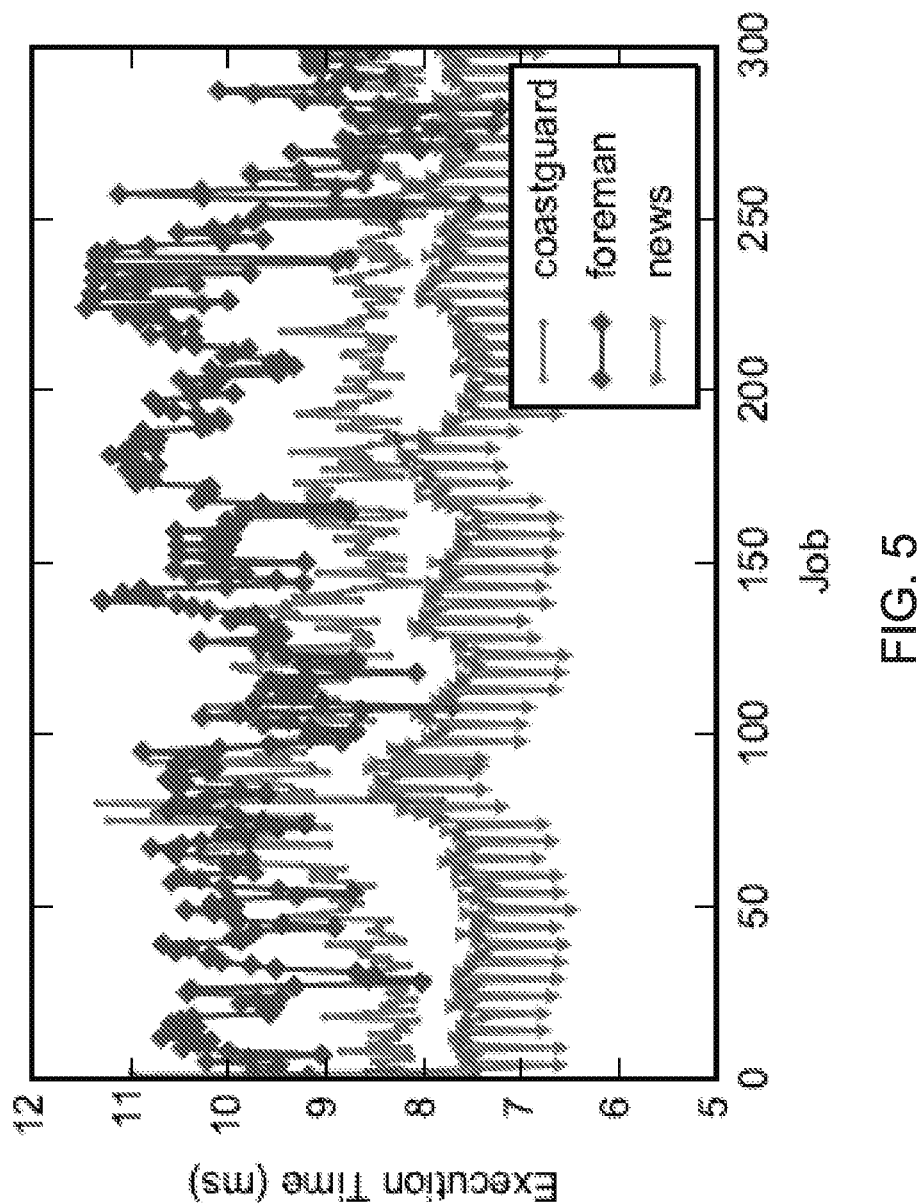
FIG. 5 shows an example of the execution time for a hardware H.264 decoder when decoding three video clips of the same resolution.

Task's execution time may vary from job to job due to multiple reasons. One major source of variation comes from changes in program inputs. For example, FIG. 4 shows the execution time per job (frame) for a video decoder application (ldecode) running on an ODROID-XU3 development board. There are large variations in execution time from job to job due to differences in input and program state when each job executes. FIG. 5 shows the execution time for a hardware H.264 decoder when decoding three video clips of the same resolution. Even though all frames have the same resolution, there is a large variation in job execution time for frames in different videos, or even between frames in the same video. The reason for such large execution time variations is that for each frame, depending on the content in it, the H.264 algorithm chooses different modes to encode each macroblock in a frame, which leads to different complexity in computation, and thus different execution time. If the frequency for frames can be lowered to shorter execution time, significant energy savings can be achieved.

Figure 6:
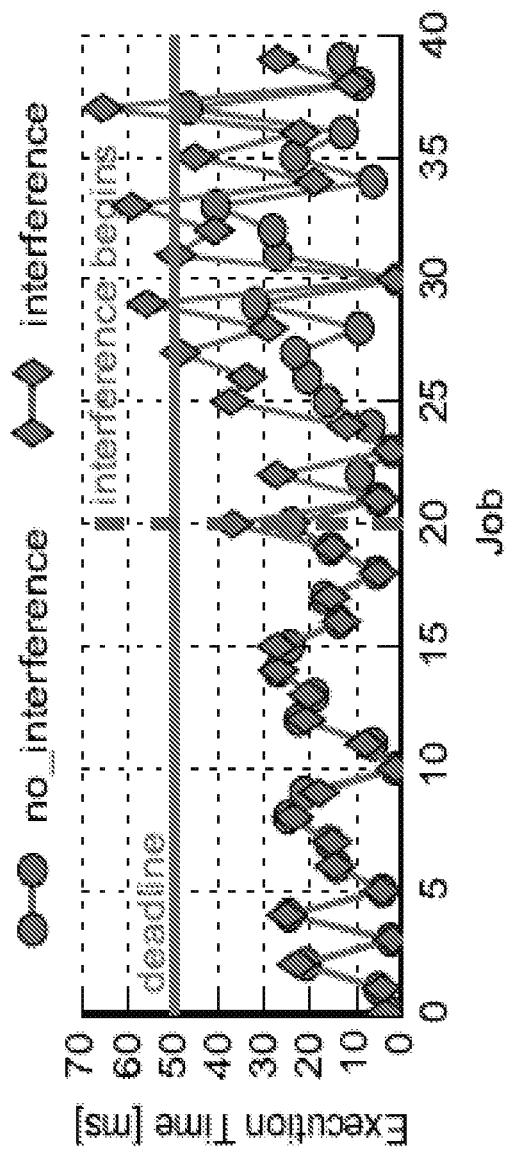
FIG. 6 shows an example of the execution times of each job for the SHA-1 hash function with and without interference.

The execution time can also vary due to changes in a program's execution environment. For example, FIG. 6 shows the execution times of each job for the SHA-1 hash function with and without interference. Here, the interference was added by running additional applications on the same core together with SHA-1, starting at Job 20. As shown in the figure, the execution time becomes significantly higher with the interference. If a prediction model does not capture the variation from run-time interference, a prediction-guided DVFS leads to poor user experiences due to deadline misses.

Figure 7:
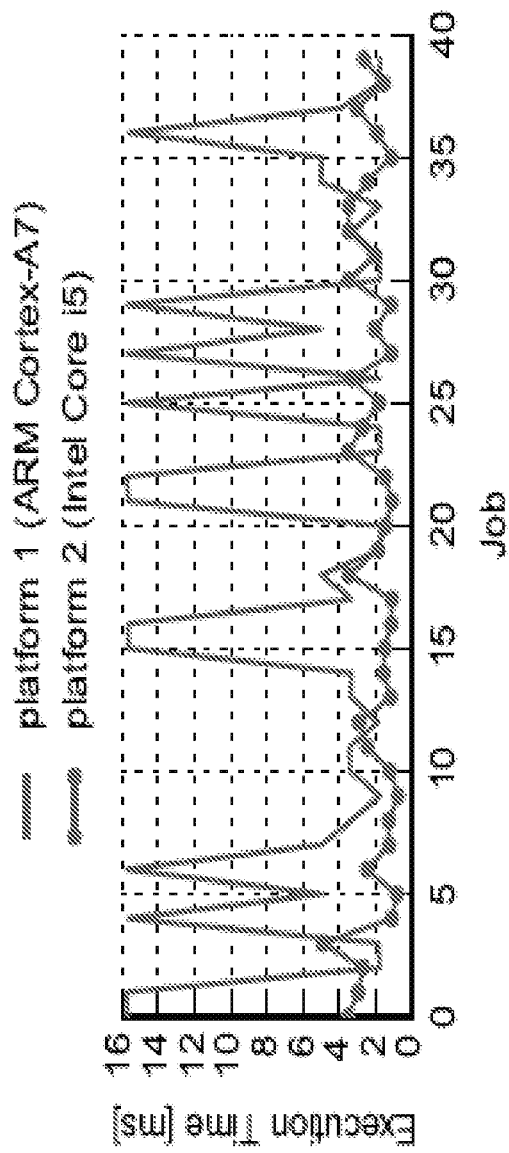
FIG. 7 shows an example of the difference in execution time of a game on two different platforms: ARM Cortex A7 and Intel Core i5.

The execution time of a task also varies significantly across platforms. FIG. 7 shows the difference in execution time of a game on two different platforms: ARM Cortex A7 and Intel Core i5. An execution environment for a program can vary considerably even on a single processor because modern processors can run with many configurations. For example, a processor cache may be allocated differently using a partitioning mechanism. Similarly, memory controllers and on-chip interconnect networks may run with multiple clock frequencies or may include quality-of-service (QoS) mechanisms to control resource allocations.

Setting an appropriate DVFS level for each job, therefore, is not easy. The large and irregular variations in workload make it difficult to predict the next job's execution time. Without accurate prediction, the DVFS controller has to be conservative and use higher DVFS levels to avoid deadline misses, which loses opportunities for energy reduction. Otherwise, the DVFS controller risks missing deadlines when there is a sudden increase in job execution time. The large variations from job to job imply that it is desirable to have a fine-grained, per-job decision of the DVFS level to use in order to minimize energy usage while avoiding deadline misses.

Current DVFS Controllers

DVFS is widely used for reducing the energy of computation. The key idea of DVFS is to reduce voltage and frequency to provide just enough performance to the application. An important part of a DVFS controller is the prediction of future workload, which allows the voltage and frequency to be lowered to the minimum required level while satisfying QoS requirements.

For applications without response time requirements, simple interval-based scheduling algorithms can be used. These algorithms usually divide time into fixed-length intervals and measure the utilization of the previous interval and set DVFS level for the next interval. Since response time is not a requirement, some level of performance degradation caused by workload misprediction can be tolerated. These algorithms are widely used in operating systems. For example, the Linux power governors are interval-based. For applications with response time requirements, mis-prediction has to be minimized since it degrades QoS. When utilization is high, voltage and frequency are increased, while when utilization is low, voltage and frequency are decreased. This does not explicitly take into account deadlines and can result in high energy usage or deadline misses. For example, high CPU utilization can cause a high voltage and frequency level to be used. However, the time budget for the task may actually be very long and a lower voltage and frequency would be sufficient, resulting in lower energy usage. Similarly, CPU utilization for a job could be low due to memory stalls, causing the controller to lower voltage and frequency levels. However, if the task has a tight time budget, then this can result in a deadline miss, whereas running at higher frequencies may have been able to meet the deadline.

DVFS has been explored in hard real-time systems in order to save energy while guaranteeing that deadlines are met. In order to ensure that deadlines are never missed, the analysis must be strictly conservative which limits the amount of energy that can be saved. That is, a task will always be run at a frequency such that even the slowest jobs will meet the deadline.

The following summarizes some additional DVFS approaches:

Table-based: Some hardware accelerators, including the Multi-Format Codec (MFC) in Samsung Exynos Series SoCs, use a lookup table to determine the DVFS level. The table is addressed by a coarse-grained parameter, such as the resolution of a video. Before decoding a video, the driver will look into the table and set a DVFS level for the entire video sequence. People have also studied using the type of frames as inputs to the table. However, these approaches do not take into account fine-grained job-to-job execution time variations. Essentially, these approaches set DVFS levels to the worst case for that coarse-grained parameter used to index the table. The coarse-grained approach loses opportunities for energy reduction.

Figure 8:
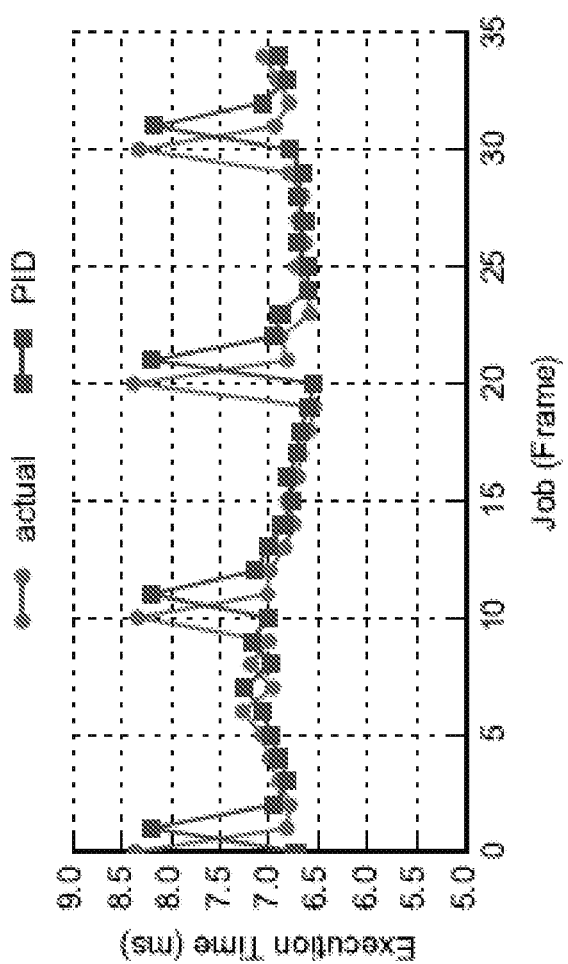
FIG. 8 shows an example of a PID-based controller mispredicting job execution time for 11.264 video decoding.

Reactive Control: A number of reactive control approaches have been proposed to adjust DVFS levels. In some approaches, job execution time history can be used to predict future job execution time, and set DVFS levels accordingly. Others use control theory-based approaches, such as PID control. Most of these approaches target software-based systems, but some of them also consider hardware accelerators. These approaches are simple to implement, and work well for applications whose execution time varies slowly with time. However, many applications and accelerators do not fall into this category. For applications with rapid changes in job-to-job execution time, reactive decisions to adjust DVFS levels tend to lag behind actual changes, leading to deadline misses. FIG. 8 shows an example how a PID-based controller mispredicts job execution time for 11.264 video decoding. When actual execution time shows spikes occasionally, the PID controller's prediction lags behind by one frame, causing one under-prediction and one over-prediction, which leads to one job missing deadline and one job running at unnecessarily high frequency around the spike. Apart from lagging behind in decision making, reactive control approaches cannot apply in some cases. For example, when browsing a website, the images sent to the JPEG decoding accelerator usually do not show correlation between the previous images and the next image, which renders any reactive control approaches ineffective.

Predictive Control: Predictive approaches can predict execution time and set DVFS levels accordingly. The target applications include interactive games, video player, web browser, servers. Predictive control has been shown to outperform reactive control for these applications. However, these approaches use application-specific features for prediction, which require domain-specific knowledge to obtain.

Predictive control of DVFS applicable for both software and hardware accelerators is largely unexplored.

Adaptive Prediction Framework

This patent document discloses a general and automated framework in order to create prediction-based DVFS controllers that can minimize energy usage without missing deadlines. The framework is capable of handling all three major sources of execution time variations discussed in the previous section: input-dependent variations, variations form run-time interference, and variations across different platforms and configurations. This framework can also be extended to guided DVFS control and migration between heterogeneous cores.

Overview

An overview of prediction-based control is shown in FIG. 1. The basic idea is that tasks can be pre-pended with a small segment of code. This segment of code can be used to predict an appropriate DVFS level to use for each task depending on input and current program state. One of the main challenges in developing a prediction-based DVFS controller is determining how to map job input and program state values to the appropriate DVFS frequency level. In general, finding a direct mapping from input values to frequency levels is challenging because the mapping can be irregular and complicated. In addition, this mapping varies from application to application. For example, for one application, pressing the "down" key may correspond to a large increase in execution time while for other applications it may have no effect on execution time. One solution is to take advantage of the program source to give hints about how input values and program state will affect execution time.

Figure 9:
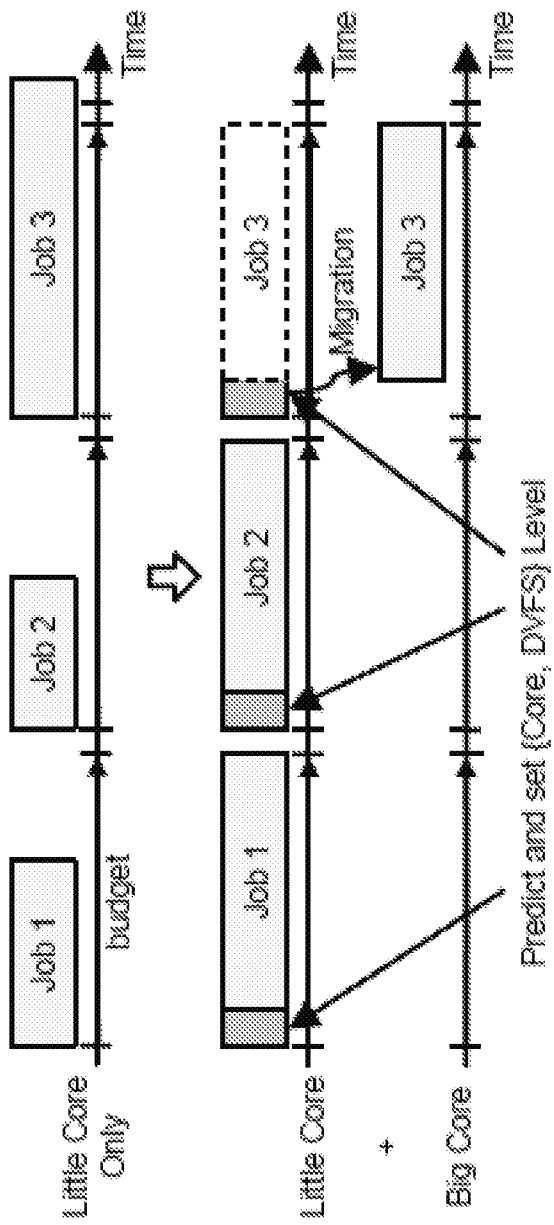
FIG. 9 shows an example of prediction-guided DVFS and task migration working on two cores as compared to running jobs on only one little core without any prediction.

FIG. 9 illustrates how this prediction-guided DVFS and task migration work on two cores as compared to just running jobs on one core (e.g. a little core) without any prediction. In the prediction-guided approach, the framework builds a model that can predict the execution time of each job. This model is used at the beginning of each job's time budget to estimate the DVFS levels and core types that can meet the deadline for the job. Then, the controller migrate a job and/or adjust the DVFS level in order to meet the deadline with minimal energy consumption. In this embodiment, the controller adjusts a DVFS level on the little core before running Job 1 and Job 2 based on the execution time prediction. For Job 3, the predictor determines that the deadline cannot be met on the little core and migrates the job to the big core.

Figure 10:
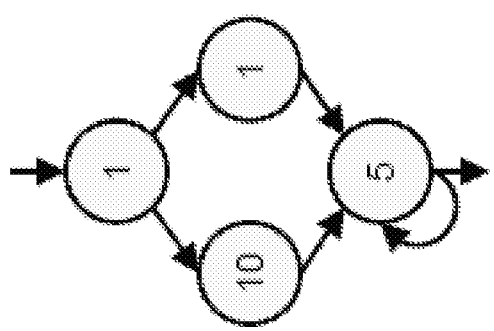
FIG. 10 shows an exemplary control flow graph.

The prediction methodology relies on the fact that, to first-order, execution time correlates with the number of instructions run. Variations in the number of instructions run are described by the control flow taken by a specific job. For example, consider the control flow graph for a task shown in FIG. 10. Each node is marked with its number of instructions. Taking the left branch instead of the right branch corresponds to nine more instructions being executed. Similarly, each additional loop iteration of the last basic block adds five instructions to the number of instructions executed. By knowing which branch is taken and the number of loop iterations, the number of instructions executed can be known and the execution time can be estimated. With an estimate of the execution time, the performance-scaling impact of DVFS can then be estimated and an appropriate frequency and voltage level can be chosen to run at in order to just meet the deadline.

Figure 11:
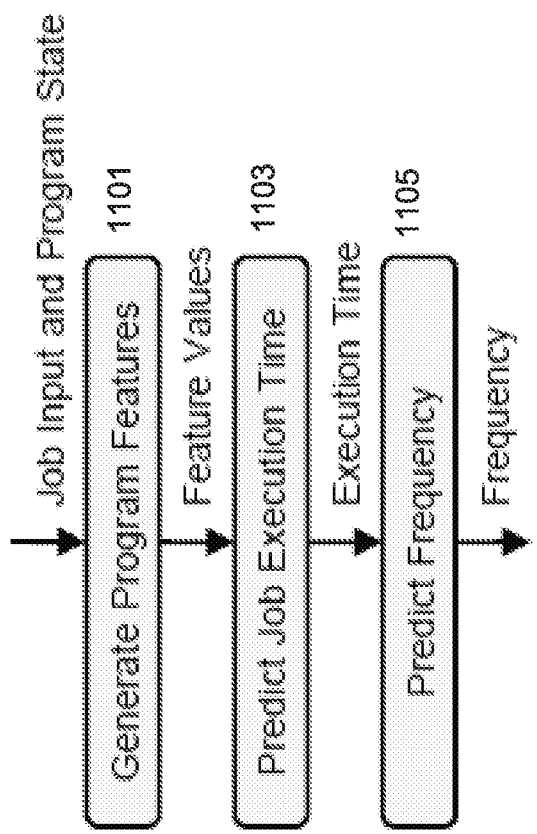
FIG. 11 shows exemplary steps to predict execution time from job input and program state.

FIG. 11 shows the main steps in the prediction method. The task source code is first instrumented and a code fragment is created using program slicing that will calculate control flow features for a job. The code fragment is run before a job executes in order to generate the control flow features 1101. Next, a linear model, which is trained offline, is used to map control flow features to an execution time estimate for the job 1103. Finally, classical linear models that describe the frequency-performance trade-off of DVFS are used to select an appropriate frequency 1105.

In some embodiments, instead of training this model off-line, it is desirable to continuously update the model on-line while executing an application. For each job, the model is first used to determine the appropriate core and frequency. After the job finishes, the model is updated using the execution time of that job. This continuous on-line learning enables the DVFS controller to adapt to run-time interference and also run effectively on diverse platforms without off-line training.

Programmer Annotation

Figure 12:
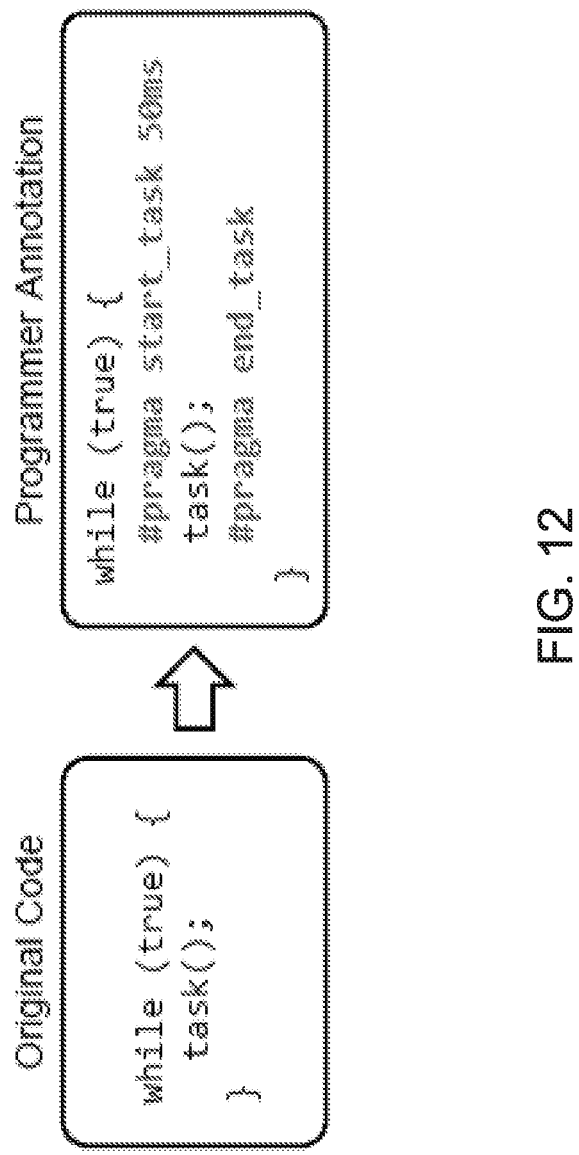
FIG. 12 shows an example of programmer annotation to mark task boundaries and time budgets.

Programmer annotation is necessary in order to identify tasks and their time budgets, A programmer can annotate the start and the end of a task and the desired response-time requirement. FIG. 12 shows an example of this annotation. In some embodiments, for ease of analysis and to ensure that tasks that start always end, the start and end of a task are within one function. Arbitrary code paths can be modified to fit this model by using a wrapper function or re-writing the code. Multiple non-overlapping tasks can also be supported.

Program Features

The first step needed is to generate control flow features. The task source is first instrumented to count control flow features. In some embodiments, the task is specifically instrumented to count the following features: (1) number of iterations for each loop (2) number of times each conditional branch is taken (3) address of each function pointer call.

Figure 14:
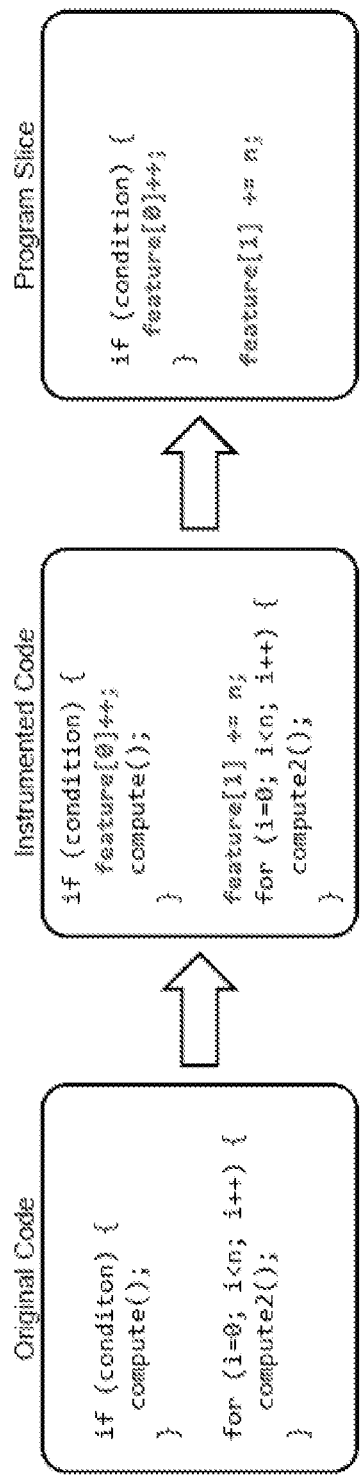
FIG. 14 shows an exemplary program slicing for control flow features.

FIG. 13 shows examples of how these features are instrumented. Because control flow features explain most of the execution time variation, some embodiments place main focus on them. However, other features, such as variable values or memory accesses, can also be included to improve the prediction accuracy. Generating these features using an instrumented version of the task code is not suitable for prediction because the instrumented task will take at least as long as the original task to run. Instead, it is necessary to quickly generate these features before the task execution. In order to minimize the prediction execution time, program slicing is used to produce the minimal code needed to calculate these features. FIG. 14 shows a simple example of the program slicing flow. By removing the actual computation and only running through the control flow, the execution time can be greatly reduced. The resulting program slice that computes the control flow features is referred to as the prediction slice or simply as the slice.

One problem that arises with running this prediction slice before a task is the issue of side-effects. That is, the slice could write to global variables and break the correctness of the program. In order to prevent this, the slice creates local copies of any global variables that are used. Values for these local copies are updated at the start of the slice and writes are only applied to the local copy.

Execution Time Prediction Model

Next, the execution time from the control flow features is predicted. Table 1 summarizes the variables and notation that are used in this section.

TABLE 1

Variable and notation descriptions

| Variable | Type | Description |
| --- | --- | --- |
| y | Scalar | Predicted execution time |
| x | Vector | Feature values |
| β | Vector | Model coefficients |
| ȳ | Vector | Profiled execution times |
| X | Matrix | Profiled feature values |
| Xβ − ȳ | Vector | Prediction errors |
| α | Scalar | Under-predict penalty weight |
| γ | Scalar | Number of terms penalty weight |
| ‖·‖ | Scalar | L2-norm (sum of squares) |
| ‖·‖₁ | Scalar | L1-norm (sum of absolute values) |

A linear model is used to map features to execution time as this captures the basic correlation. A linear model has the advantage of being both simple to train and fast to evaluate at run-time. In addition, it is always convex which allows the use of convex optimization-based methods to fit the model. In some embodiments, higher-order or non-polynomial models may be used to provide better accuracy.

The linear model can be expressed as $\bar{y}=x\beta$, where $\bar{y}$ is the predicted execution time, x is a vector of feature values, and β are the coefficients that map feature values to execution time. These coefficients are fit using profiling data. Specifically, the program is profiled to produce a set of training data consisting of execution times y and feature vectors X (i.e., each row of X is a vector of features, xi, for one job). In order to achieve the expected linear correlation between features and execution time, addresses recorded for function calls can be converted to a one-hot encoding indicating whether particular function addresses were called or not.

The most common way to fit a linear model is to use linear least squares regression. Linear least squares regression fords the coefficients β that minimize the mean square error:

$$\operatorname*{argmin}_{\beta} \|X\beta - y\|^2$$

Essentially, this aims to minimize the sum of the absolute errors in the prediction. That is, it weights negative and positive errors equally. However, these two errors lead to different behaviors on the system. Negative errors (under-prediction) lead to deadline misses since the job is predicted to run faster than its actual execution time. On the other hand, positive errors (over-prediction) result in an overly conservative frequency setting which does not save as much energy as possible. In order to maintain a good user experience, it is desirable to avoid deadline misses, possibly at the cost of energy usage. In other words, greater weight can be placed on avoiding under-prediction as opposed to over-prediction. In some embodiments, greater weight is placed on under-prediction by modifying the optimization objective:

$$\operatorname*{argmin}_{\beta} \|pos(X\beta - y)\|^2 + \alpha\|neg(X\beta - y)\|^2$$

where pos(x)=max {x, 0} and neg(x)=max{−x, 0} and these functions are applied element-wise to vectors. Thus, ‖PS(Xβ−y)‖² represents the over-prediction error and ‖neg(Xβ−y)‖² represents the under-prediction error. α is a weighting factor that allows the system to place a greater penalty on under-predictions by setting α>1. Since this objective is convex, existing convex optimization solvers can be used to solve for β.

Coefficients which are zero imply that the corresponding control flow features do not need to be calculated by the prediction slice. This information can be used to further reduce the size and execution time of the prediction slice. The optimization objective is extended to favor using less features by using the Lasso method:

$$\operatorname*{argmin}_{\beta} \|pos(X\beta - y)\|^2 + \alpha\|neg(X\beta - y)\|^2 + \gamma\|\beta\|_1$$

where $\|\cdot\|_1$ is the L1-norm and γ is a weighting factor that allows the trade-off of prediction accuracy with the number of features needed.

DVFS Control

Figure 15:
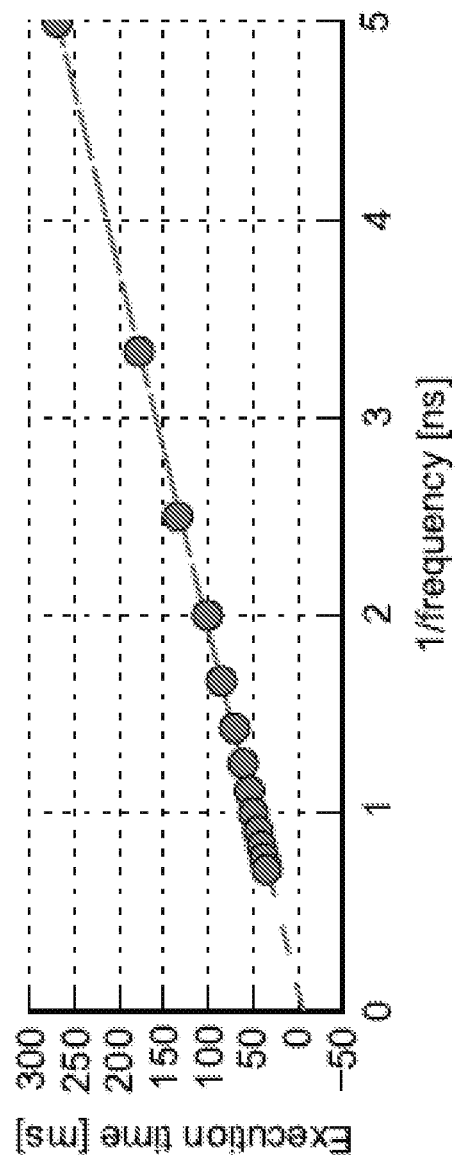
FIG. 15 shows an example of average job execution time versus 1/f for ldecode (video decoder application).

Given a predicted execution time, it is necessary to estimate how the execution time will change with varying frequency. The classical linear model can be used: $t = T_{mem} + N_{dependent}/f$, where t is the execution time, $T_{mem}$ is the memory-dependent execution time that does not scale with frequency, $N_{dependent}$ is the number of CPU cycles that do not overlap with memory and scale with frequency, and f is the frequency. FIG. 15 shows an example of the average job execution time versus 1/f for ldecode (video decoder application). It was observed that t and 1/f show a linear relationship, thus verifying the linearity assumption.

For this linear model, by predicting the execution time at two points, $T_{mem}$ and $N_{dependent}$ for a job can be determined and the minimum frequency f can be calculated to satisfy a given time budget $t_{budget}$. More specifically, the execution time $\bar{t}_{fmin}$ at minimum frequency $f_{min}$ and the execution time $\bar{t}_{fmax}$ maximum frequency $f_{max}$ can be predicted. Using these two points, $T_{mem}$ and $N_{dependent}$ can be calculated as:

$$N_{dependent} = \frac{f_{min}f_{max}(\bar{t}_{f_{min}} - \bar{t}_{f_{max}})}{f_{max} - f_{min}}$$

$$T_{mem} = \frac{f_{max}\bar{t}_{f_{max}} - f_{min}\bar{t}_{f_{min}}}{f_{max} - f_{min}}$$

For a given budget $t_{budget}$, the minimum frequency $f_{budget}$ that will meet this time can be calculated as:

$$f_{budget} = \frac{N_{dependent}}{t_{budget} - T_{mem}}$$

Figure 16:
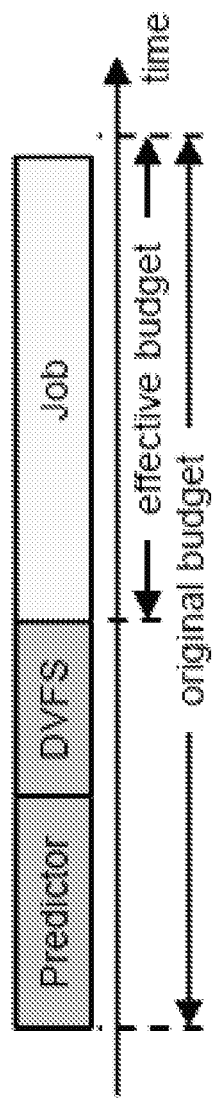
FIG. 16 shows an exemplary diagram of the effective time budget as compared to the original time budget.
Figure 17:
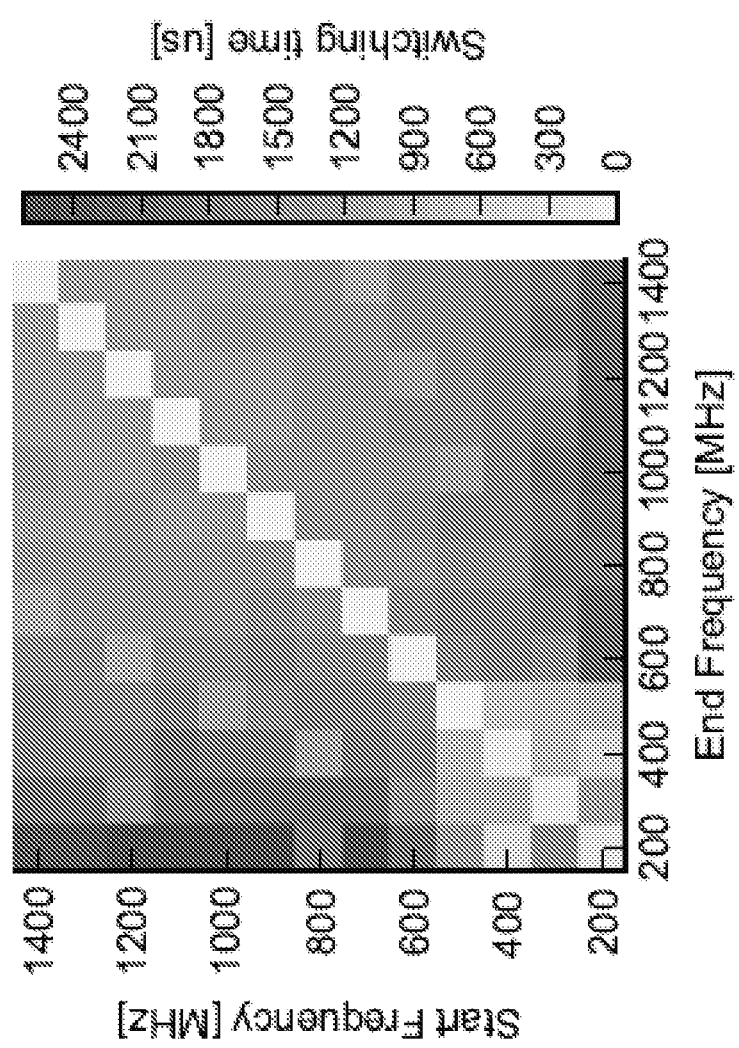
FIG. 17 shows an example of the 95th-percentile DVFS switching times for the test platform for each possible start and ending frequency.

Since execution time can vary even with the same job inputs and program state, a margin is added to the predicted execution times used ($t_{fmin}$ and $t_{fmax}$). In some embodiments, a margin of 10% is used. A higher margin can decrease deadline misses while a lower margin can improve the energy savings. The resulting predicted frequency can be the exact frequency that will just satisfy the time budget. However, DVFS is only supported for a set of discrete frequency levels. Thus, the actual frequency is the smallest frequency allowed that is greater than $f_{budget}$. The execution of the prediction slice and DVFS switch reduces the amount of time available for a job to execute and still satisfy its budget. Thus, as shown in FIG. 16, the effective budget when choosing a frequency to run at needs to consider these overheads. Although the execution time of the prediction slice can be measured, the DVFS switching time must be estimated, as the switch has not been performed yet. This is done by microbench-marking the DVFS switching time. FIG. 17 shows the 95th-percentile DVFS switching times for the test platform for each possible start and ending frequency.

Offline Analysis

Figure 18:
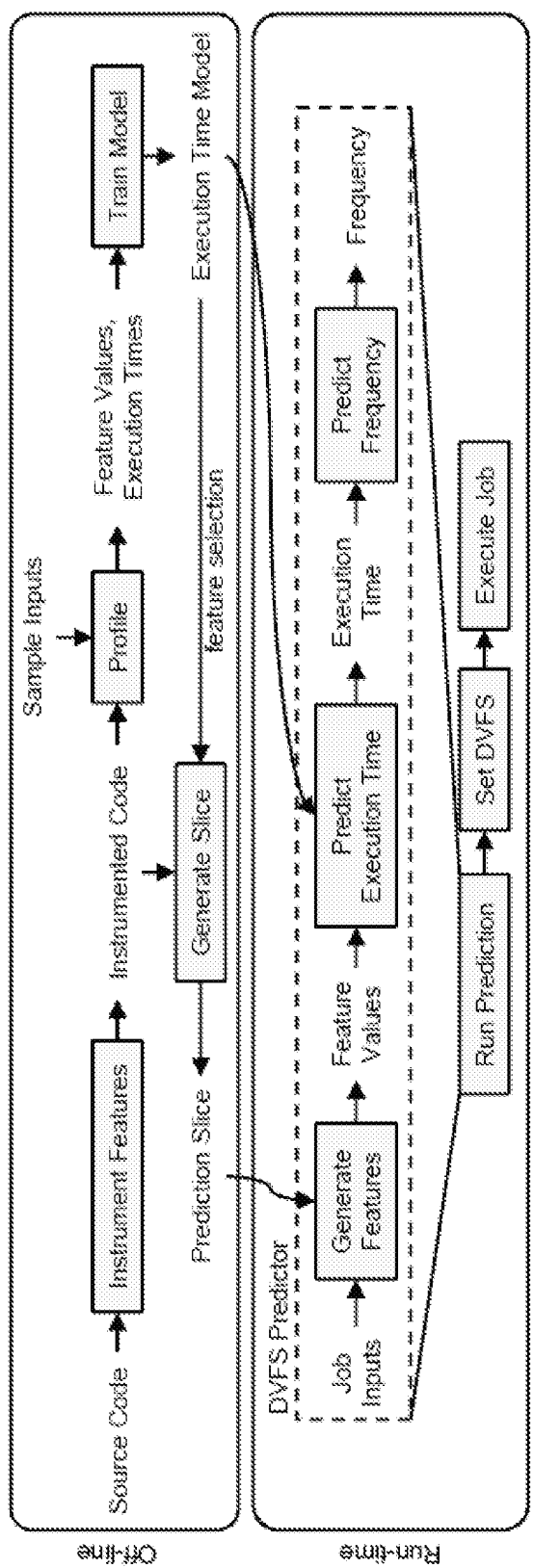
FIG. 18 shows an exemplary overall flow for prediction-based DVFS control.

FIG. 18 shows the overall flow of the framework for creating prediction-based DVFS controllers. After tasks are identified by programmer annotation, they can be automatically instrumented to record control flow features. In some embodiments, these tasks are profiled offline to collect traces of feature values and job execution times. This is used to train the execution time prediction model as described previously. Since execution time depends on the specific hardware and platform that an application is run on, profiling and model training needs to be done for the platform that the application will be run on. For common platforms, the program developer can perform this profiling and distribute the trained model coefficients with the program. Alternatively, profiling can be done by the user during the application's installation.

The trained execution time model only requires a subset of all the features to perform prediction. Thus, this information is used to eliminate code for calculating unneeded features. Program slicing is then used to create a minimal code fragment to calculate the needed control flow features. Note that since the features needed depends on the training of the execution time prediction model, which is platform-dependent, the features needed could vary across platforms. However, features that are needed are primarily a function of the task semantics (i.e., execution time variations across control paths) rather than the platform is run on. In some embodiments, the predictions made for an x86-based (Intel Core i7) platform when using the features selected for an ARM-based ODROID-XU3 platform are compared with the features selected for the x86 platform itself. For all but three of the benchmarks tested, the features selected were exactly the same. For one of these, the features selected by the x86 platform were a subset of those selected by the ARM platform and so the predicted times were exactly the same. For the remaining two benchmarks, the predicted times differed by less than 3%. Although the execution time model coefficients have to be retrained, the same prediction slice was applicable across both platforms.

Online Model Training

Figure 19:
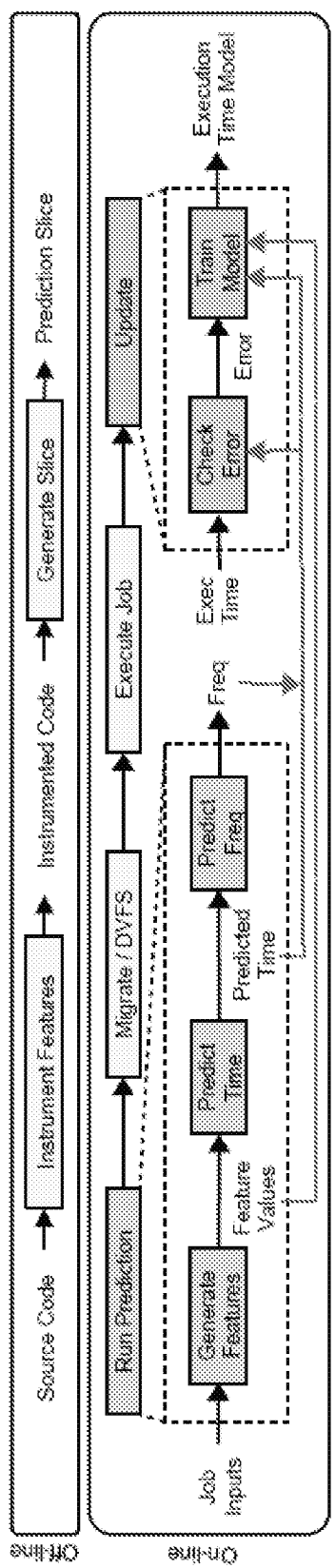
FIG. 19 shows an exemplary overall flow for the prediction-guided controller with continuous on-line learning.

Instead of training this model off-line, in some embodiments, the model can be continuously updated the on-line while executing an application, as shown in FIG. 19. For each job, the model is first used to determine the appropriate core and frequency. After the job finishes, the model is updated using the execution time of that job. This continuous on-line learning enables the DVFS controller to adapt to run-time interference and also run effectively on diverse platforms without off-line training.

In order to build an on-line training model with continuously updated information, there are three major challenges:

1. The model must be updated in an efficient manner.
2. The model must handle the inaccuracy during the initial training phase.
3. The model must be able to detect and quickly adapt to an sudden changes such as program interference.

First, the overhead of updating the model should be as small as possible. If this overhead is too high, then the energy consumed by updating the model could outweigh the energy savings from slowing down the jobs. It could also cause jobs to miss their deadline. Updating the model quickly, however, is not easy due to the fact that as the size of the X matrix grows, calculating the matrix inverse of $X^T X$ becomes increasingly expensive.

Second, during the initial training phase, the model will be inaccurate because only a small number of jobs have been seen. If this premature model is used, it is likely to mispredict the execution time, resulting in high energy usage and/or deadline misses. It is, therefore, necessary to check the stability of the model as it is trained and only adopt it when it becomes mature enough.

Finally, unexpected events such as program interference can occur which can affect the availability of resources. These effects can cause the trained model to become suddenly inaccurate. Thus, it is necessary for these sudden effects to be detected and for the model to be quickly retrained under the new conditions.

The challenge of quickly updating the model can be handled by limiting the size of the X matrix (e.g., by replacing the old data with new samples). However, this decreases the information available for training the model, which can impact its accuracy. Instead, QR decomposition can be used to perform fast updates for linear least squares regression without losing training information.

A QR decomposition can be applied to the X matrix: X=QR where Q is an orthogonal matrix and R is an upper triangular matrix. The prediction equation then becomes: y=xβ=QRβ. The β which minimizes the mean square error can then be calculated as: $\beta=R^{-1}Q^{-1}y$.

Since Q is orthogonal, it has the property that $Q^{-1}=Q^T$ so the inverse of Q is easy to calculate. R has the same dimensions as X, so as more rows are added to X, the size of R also increases. However, since R is upper-triangular, rows past the column-width of R are all zero, limiting the amount of computation needed. Thus, given a QR decomposition of X, β can be easily computed, regardless of the size of X. The challenge now becomes quickly calculating the QR decomposition of X. Although the QR decomposition can be expensive to calculate in general, it is easily updated for the current application. A new QR decomposition can be updated from the previous decomposition by using a series of Givens rotations G=Gm,1 Gm,2 . . . Gm,n. With the Given rotation, the QR decomposition can be easily updated as:

$$\tilde{R} = G^T \begin{pmatrix} R \\ x_{m+1} \end{pmatrix} \text{ and } \tilde{Q} = \begin{pmatrix} Q & 0 \\ 0 & 1 \end{pmatrix} G$$

where Q and R are the old decomposition and $\tilde{Q}$ and $\tilde{R}$ are the new decomposition.

Note that the model is trained on, and thus predicts, execution times assuming the system is running at the maximum frequency. Thus, for jobs that run at a lower frequency, the execution time recorded for training is scaled based on the frequency.

Initial Training Phase

During the initial training of the model, the prediction accuracy can be low. Specifically, while there are fewer sample points than model coefficients, the prediction model is underdetermined and there is not enough information to solve the linear system. Thus, it is desirable to wait until there is enough data and the prediction errors have stabilized. In order to do this, the prediction error is monitored by calculating the difference between the measured execution time of jobs and the predicted times. As shown in Algorithm 1, when a number of consecutive jobs all show errors less than a given margin, the prediction model is considered to be stable.

---
Algorithm 1 Algorithm for Checking Stability
---

```
1: procedure IS_STABLE(*errors, prev_is_stable)
2:     if prev_is_stable = 0 then
3:         is_stable ← 1
4:         for i ← 1, n_jobs do            ▷ n_jobs = 10
5:             if errors(i) > margin then  ▷ margin = 10%
6:                 is_stable ← 0
7:                 break
8:     else if prev_is_stable = 1 then
9:         is_stable ← 0
10:        for i ← 1, n_jobs do
11:            if errors(i) <= margin then
12:                is_stable ← 1
13:                break
14:    return is_stable
```

In some embodiments, checking ten consecutive jobs and using an error margin of 10% worked well for determining stability. Until stability is reached, jobs can be run at the maximum frequency available in order to avoid deadline misses.

Fast Adaption with Explicit Event Detection

In addition to errors during the initial training phase, the prediction model can also show large errors when an interference event occurs. For example, new applications starting or running applications ending can affect tasks of interest due to increases or decreases in system resource availability. If such an event occurs, it is desirable to quickly retrain the prediction model. Algorithm 1 can be used again to detect for instability in the prediction model as the system is running. As shown in Algorithm 2, if instability is detected and the prediction model is not in the training phase, an even can be marked.

---
Algorithm 2 Algorithm for Detecting Event
---

```
1: procedure IS_EVENT (is_stable, is_training)
2:     is_event ← 0
3:     if is_stable = 0 & is_training = 0 then
4:         Remove old data to re-train
5:         Use previous model with a higher margin
           until re-training is done
6:         is_event ← 1
7:         is_training ← 1
8:     return is_event
* A variable is_training is to distinguish an actual event and unstable
  model. Initially set as 1, and become 0 as soon as the model is stable.
* New higher margin depends on error.
```

When an event is detected, the existing training data is immediately dropped and the model needs to be trained from scratch. Alternatively, a lower weight can be given to the old training data instead of dropping it altogether.

Run-Time Prediction

Figure 38:
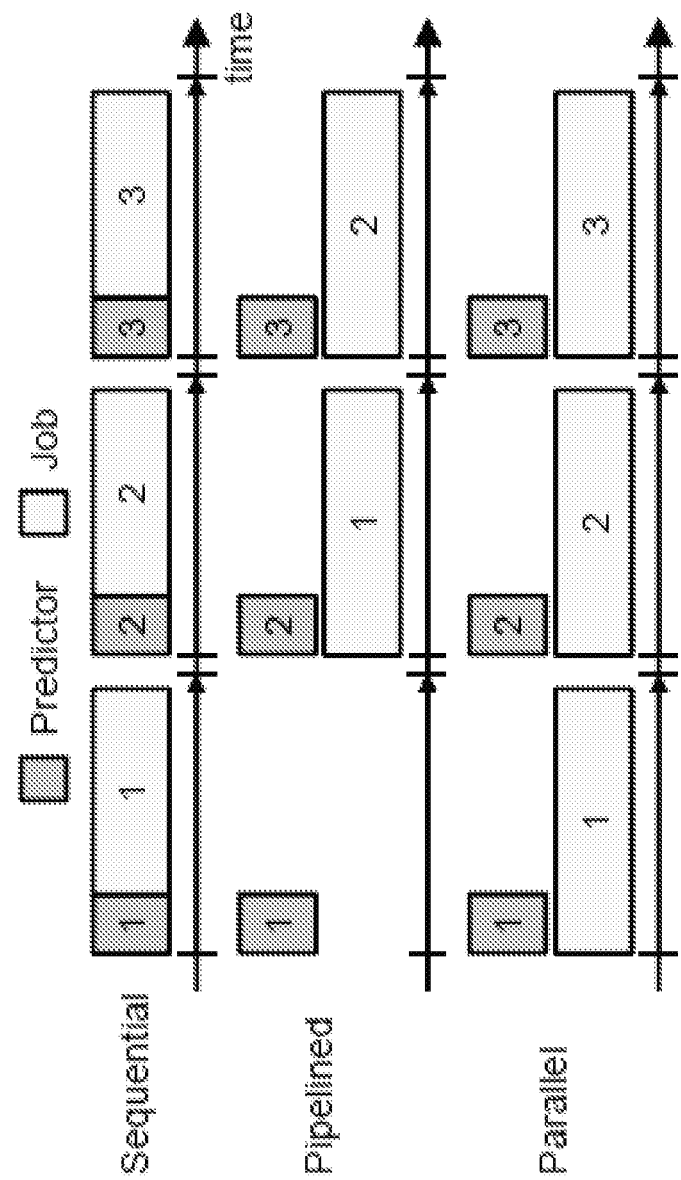
FIG. 38 shows exemplary options for running predictor.

The prediction slice, execution time predictor, and frequency predictor are combined to form the DVFS predictor or simply predictor There are several options for how to run the predictor in relation to jobs. FIG. 38 shows some of these options. The simplest approach is to run the slice just before the execution of a job. This uses up part of the time budget to perform slicing. However, if this time is low, then the impact is minimal.

An alternative option would be to run the predictors and jobs in a parallel, pipelined manner such that during job i, the predictor for job i+1 is run. This ensures that the DVFS decision is ready at the start of a job with no impact on time budget from the predictor. However, this assumes that information needed by the prediction slice, specifically the job inputs and program state, is ready one job in advance. This is not possible for interactive tasks which depend on real-time user inputs or tasks which are not periodic.

The predictor could also be run in parallel with the task. This avoids the issue of needing input values early. In terms of time budget, this mode of operation still reduces the effective budget by the predictor execution time. However, part of the task also executes during the prediction time. By accounting for this, the energy savings may be higher than running in a sequential manner. Running in parallel also avoids the issue of side-effects caused by the prediction slice. However, running in parallel either requires forking off the predictor for each job or sharing data with a dedicated predictor thread, both of which can introduce overhead.

In some embodiments, the execution time of the predictor is low and the predictor and task are run in a sequential manner. For applications which require more complicated predictors, these alternative operation modes may be beneficial.

Task Migration on Heterogeneous Cores

The prediction-guided DVFS control methodology can be extended to select core types in a heterogeneous system. Similar terminologies with ARM's big/little architecture can be sued: a little core is a power-efficient core, while a big core is a more powerful but power-hungry core. As a naive implementation, at the beginning of the task, two separate prediction models can be trained for the two core types, and then use the models after both models become stable. This, however, can bring unnecessary overhead if the task never needs a big core. Thus, in some embodiments, the model for a big core can be trained only when it is necessary. More specifically, if the model for a little core predicts that the execution time for a job will be longer than the given time budget (i.e. $f_{new}$ on the little core is higher than its maximum frequency), the job can be switched to a big core. The big core model is then trained and used. With these two prediction models, the execution time and the new frequency for both cores can be predicted before running a job. By comparing the power at each predicted frequency, the most energy-Core=$(P_{big}[f_{new\_big}]<P_{little}[f_{new\_little}])$?(big):(little) efficient core can be chosen as where P[f] is the power at frequency f and $f_{new\_big}$ and $f_{new\_little}$ are the new predicted frequencies for a big and little core, respectively. If $f_{new\_little}>f_{max\_little}$ (i.e., the little core is not able to meet the required time budget), then the big core is used.

Prediction-Based Control of Hardware Accelerators

Figure 20:
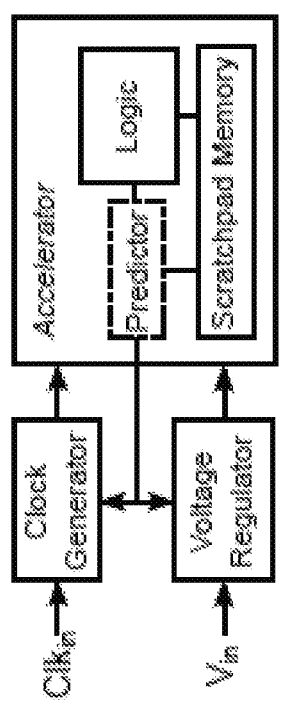
FIG. 20 shows an exemplary block diagram of a hardware accelerator with execution time prediction-based DVFS.

FIG. 20 shows a block diagram of a hardware accelerator with execution time prediction-based DVFS. For each job, the predictor informs the clock generator and voltage regulator the frequency and voltage to be used. Access to the scratchpad memory is time-multiplexed between the predictor and the main computation logic. Although in some embodiments the predictor directly controls DVFS circuitry, the control can also be done in software through the operating system.

Several goals drive the design of the hardware accelerators:

Look-ahead: Instead of reacting to changes in job execution time, the DVFS controller looks ahead into upcoming jobs and predicts what the execution time would be before actually running the jobs.

General: The DVFS framework can be general and applicable to a wide range of accelerators. The framework may not use application-specific knowledge.

Automated: The DVFS controller can be generated by an automated flow with minimal manual effort.

Low overhead: The DVFS controller can have low overhead in terms of area and energy, or increased design complexity.

Figure 21:
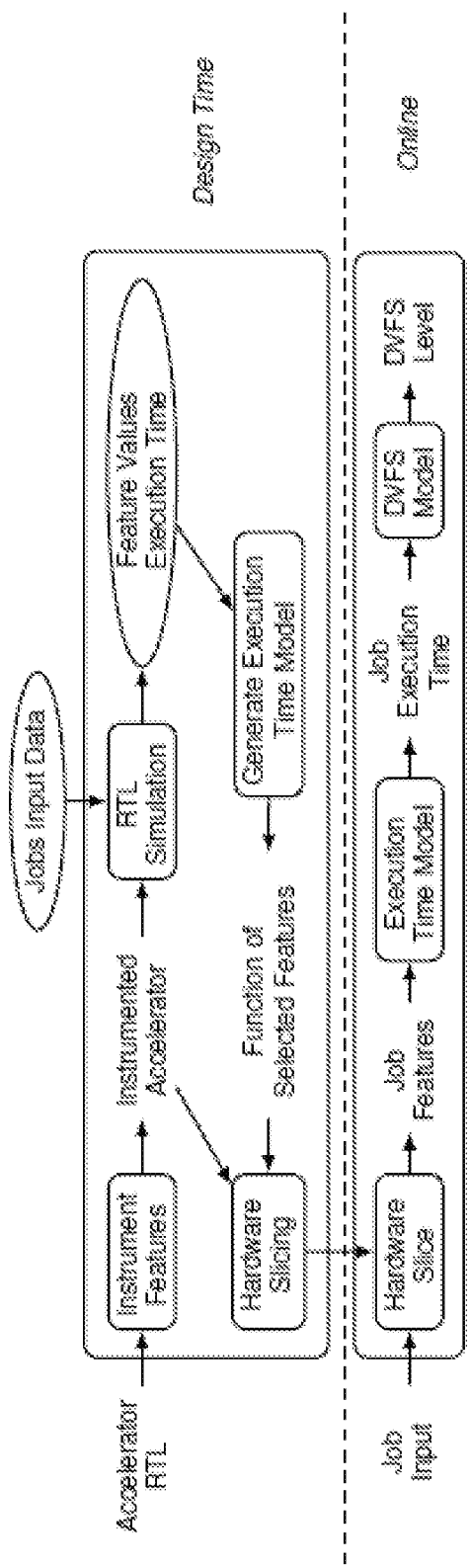
FIG. 21 shows an exemplary high-level flow diagram for DVFS framework based on execution time prediction.

FIG. 21 shows the high-level flow for DVFS framework based on execution time prediction. It consists of two parts. The offline part works during the design process of the accelerator to generate the predictor. The online part shows the operation of the predictor during accelerator execution. This framework can also be applied to other methods for performance/energy trade-off, such as power gating, or dynamically reconfiguring accelerators to different performance/energy points, etc.

Source of Execution Time Variation

Figure 22:
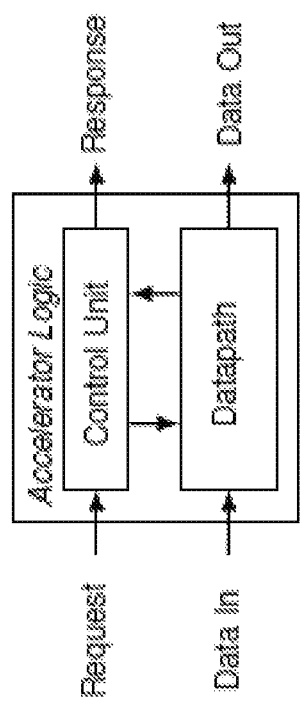
FIG. 22 shows an exemplary control-datapath structure of an accelerator.
Figure 23:
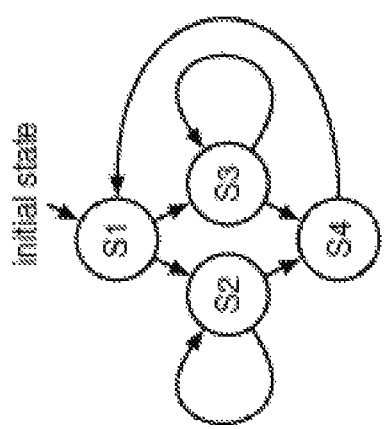
FIG. 23 shows an example of Finite State Machine (FSM) from the control unit of an accelerator.

FIG. 22 shows the typical high-level structure of an accelerator. It mainly consists of two parts: control unit and datapath. The control unit is responsible for handling requests and responses, as well as orchestrating computation in the datapath by generating various control signals. The datapath performs computation on the input data to generate the output, and also generates various signals for the control unit to make decisions. The control unit is usually composed of one or more Finite State Machines (FSMs). FIG. 23 shows an example of FSM from the control unit of an accelerator. In state S1, the accelerator reads a piece of input data. Then, depending on the value, the FSM transitions to either state S2 or S3 to perform computation. When computation is done, the FSM transitions to state S4 to generate an output, then transitions back to S1 to process the next input. The computation in state S2 and S3 can take different number of cycles (for example, 50 and 100 respectively). This is one major source of execution time variation.

A job usually uses multiple inputs. For example, an image consists of multiple macroblocks. If embodiments know the decisions made by the control FSMs when processing each input, and the processing time of each computation state, embodiments can predict execution time, and consequently the best DVFS level to run the job at.

Features for Hardware Accelerators

For hardware accelerators, a feature refers a measurable property that can be extracted during accelerator execution. This section also discusses and demonstrates how these features and the control decisions they represent correlate with execution time.

It is observed that control unit decisions are embedded in the state transitions of the control unit FSM. For example, in FIG. 23, a state transition from S1 to S2 means the control unit decides to perform some computation associated with state S2. If the number of state transitions from S1 to S2 is counted, the number of times computation associated with S2 that has taken place can be known. Thus, state transition count (STC) is one type of feature that can be used in the prediction model.

However, knowing state transition counts is not enough. It is also necessary to know how each state transition impacts execution time of the accelerator. This can be divided into two cases. In one case, if the latency of a computation state is fixed, statistical regression can be used to figure out how much time the computation takes given enough training data. In the other case, if the latency is variable depending on input, statistical regression can only estimate the average latency, which is not enough to make good predictions. In this case, there can be counter to keep track of whether the computation is finished. For example, when the computation starts, the control unit sets the counter to the latency of the computation. In each cycle the counter is decremented until it reaches zero, signaling the end of computation. The range of the counter correlates with the computation's impact on execution time. In a decrementing counter, range can be obtained from the counter's initial value. In an incrementing counter, range can be obtained from the counter's final value before a reset. Thus, several counter-related features can be used: 1) initialization count (IC), which is the number of times each counter is initialized; 2) average initial value (AIV), which is the average value a counter is initialized to; and 3) average pre-reset value (APV), which is the average of a counter's final value before a reset. The last two features capture the range of each counter. Table 1 summarizes these features. Additional features may also be used in the prediction model.

TABLE 2

Summary of features in prediction model

| Feature | Source | Granularity |
| --- | --- | --- |
| STC | FSM | Each source-destination states pair |
| IC | Counter | Each counter |
| AIV | Counter | Each counter |
| APV | Counter | Each counter |

Manually annotating and modifying FSMs and counters in hardware accelerator designs would be too tedious and not feasible for large designs. Moreover, many accelerators are third-party IPs and system designers are not familiar with their internals. Thus, an automated approach is proposed to identify and extract such features in hardware accelerators based on a static analysis of RTL code of accelerators.

The first step of the analysis is to identify FSMs and counters in the RTL, since these are the sources of features. To identify FSMs and counters in RTL code, a behavioral RTL of hardware accelerators is first transformed to a structural RTL using a synthesis tool. In some embodiments, Yosys, an open-source synthesis suite, is used. After that, an algorithm is used to find FSMs in the design based on techniques for extracting FSM from gate-level netlist. The algorithm works by analyzing the RTL and look for specific structures related to FSMs. Similar to identifying FSMs, counters in hardware accelerators are also identified by analyzing the RTL.

The next step is to instrument the accelerator so that it records feature values during its operation. This is done through RTL analysis and instrumentation. For state transition counts, each FSM's transition table is extracted and the criteria for each state transition to take place is computed. For each source-destination pair, the RTL is instrumented to generate a signal whenever the transition criteria is met, and record the number of times the signal is asserted using a register. With this, a simple read-out of the register's value can indicated the state transition count. Similarly, for initialization counts, the criteria for the counter to be initialized is computed and the RTL is instrumented to generate a signal when the criteria is met. To keep track of an average initial value and an average pre-reset value, registers that are controlled by the initialization criteria computed above are used. Note that it is sufficient to record the sum of these values and the prediction model can take care of scaling the values to obtain average. All these steps are done automatically without manual effort using the RTL analysis and instrumentation framework implemented inside the Yosys open-source synthesis tool.

After instrumenting the accelerator, RTL simulations are run with a training set of job input data to obtain the feature values as well as execution time for each job.

Hardware Slicing

To obtain feature values for a job, it is necessary to run the hardware accelerator with the job's input. This is not feasible because the goal is to predict execution time before running the hardware accelerator. To address this issue, a minimal version of the hardware accelerator is generated. This minimal version is called a hardware slice. During runtime, the slice can be executed with the job's input to quickly calculate the feature values.

To generate such a slice, program slicing techniques on hardware description languages are used to only keep the part of the original accelerator that computes the features of interest, while removing other parts of the hardware. This allows the system to obtain a slice that is much smaller than the original hardware accelerator in terms of area.

However, executing such a slice would take the same number of cycles as the original hardware accelerator. The reason why a slice cannot run faster is that the control unit is not aware that some parts of the hardware were removed, and still waits in certain states as if the original computation is still taking place. For example, in FIG. 23, the FSM still transitions to S2, waits for a number of cycles, and then transitions to S4. This inefficiency can be removed by modifying the FSM transition table to remove the waiting behavior. This optimization does not affect the accuracy of the prediction because the information about how long the FSM would stay in waiting states are still available from counter initial values and pre-reset values. The resulting hardware slice efficiently calculates the control flow features of the original hardware accelerator.

DVFS Model for Hardware Accelerator

After obtaining an execution time prediction for a job under the nominal frequency, a DVFS model is used to predict what the execution time would be under different frequencies. In some embodiments, a common model that decomposes execution time into memory time and compute time can be used: $T=T_{memory}+C/f$ where T is execution time, $T_{memory}$ is the part of execution time when the accelerator is stalled waiting for memory, which does not scale with accelerator frequency. C is the number of cycles when the accelerator is not stalled, and f is the frequency of the accelerator. From the execution time prediction, it can be known that $T_0=T_{memory}+C/f_0$ where $T_0$ is the predicted execution time, and $f_0$ is the nominal frequency. To predict the execution time under a different frequency, $T_{memory}$ also needs to be known. However, for the many accelerators, $T_{memory}$ is negligible because 1) many accelerators are computation-intensive rather than memory-intensive, and 2) for accelerators that are memory-intensive, they usually have a local scratchpad memory and use a DMA engine to carefully coordinate data transfer from main memory to minimize stalls due to memory. Thus, the equation above can be simplified as $T=C/f$.

Assuming $T_{budget}$ is the time budget for the job, the accelerator can run at $f=C/T_{budget}=f_0 T_0/T_{budget}$ to minimize energy while meeting deadline.

In real hardware, however, there are only a few discrete frequencies the accelerator can run at. As a result, the frequency f can be round up to the nearest frequency level. Also, executing the hardware slice and switching voltage/frequency takes some time, which needs to be deducted from $T_{budget}$. A margin can also be added to the predicted execution time to be conservative. After taking all these into account, the final frequency level can be $f=\lceil f_0(T_0+T_{margin})/(T_{budget}-T_{slice}-T_{DVFS})\rceil$ to execute the accelerator, where $\lceil\cdot\rceil$ represents rounding to the nearest frequency level above.

Alternative Embodiments

Each step depicted in the prediction flow in FIG. 11 can be modified with alternative models as long as it produces the needed prediction for the next step. In some embodiments, more complex prediction models can be used for each step (e.g., more features generated and higher-order, non-linear models). For feature generation, automated generation of the features does not preclude the programmer from manually adding "hints" that they expect would correlate well with a job's execution time. For example, the programmer may be able to extract meta-data from input files and manually encode these to features.

Additional constraints could be added to the execution time prediction in order to limit the use of features which require high overhead to generate. Features over some overhead threshold could be explicitly disallowed or the overhead for each feature could be introduced as penalties in the optimization objective.

The last step in the flow focuses on selecting an appropriate frequency level for DVFS control. However, this last step could be modified to support other performance-energy trade-off mechanisms, such as heterogeneous cores. By using alternate models for how the execution time scales with the performance-energy trade-off mechanism, an appropriate operating point can be selected for the mechanism of interest.

Application developers can use the method to improve the energy-efficiency of applications with timing requirements. Hardware designers can use the method to improve the energy-efficiency of hardware accelerators. These can be applied to any computer systems but contexts where energy is a major concern have the most potential benefit. Mobile systems can see improved battery life from these techniques. Similarly, applying these techniques to datacenters can result in reduced energy costs.

Figure 24:
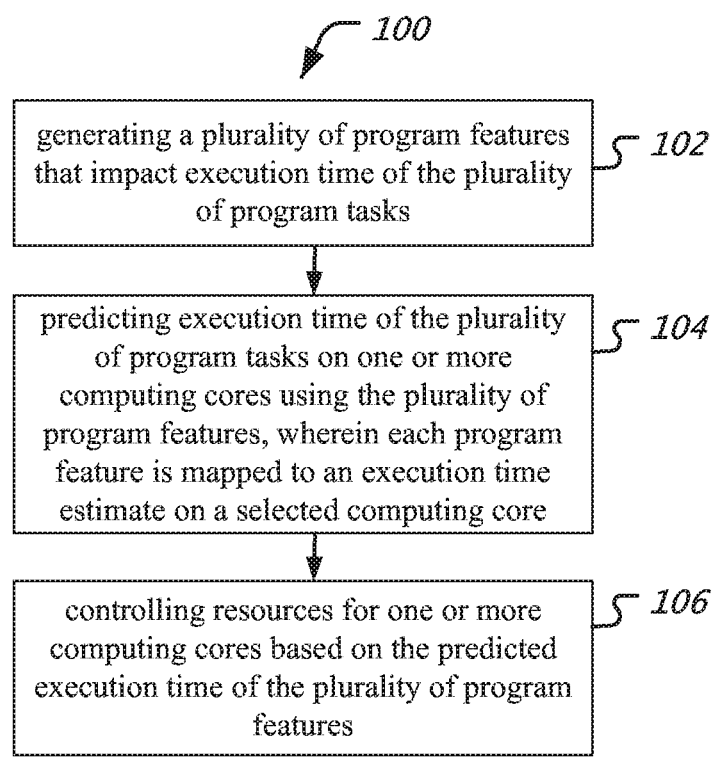
FIG. 24 shows a flowchart representation of an example of a process of using prediction-guided resource allocation technologies for software applications.

FIG. 24 is a flowchart representation of a process 100 of using prediction-guided resource allocation technologies for software applications. At 102, a plurality of program features that impact execution time of the plurality of program tasks are generated. To identify the program tasks, in some embodiments, programmer annotation may be used. The start and the end of a task and the desired response-time requirement may be annotated by a programmer, as shown, e.g., in FIG. 12. The annotated program can be instrumented to generate a set of program features. The instrumented code may not be suitable for prediction because the instrumented tasks will take at least as long as the original tasks to run. In order to minimize the prediction execution time, program slicing can be adopted in some embodiments to produce the minimal code needed to calculate the program features.

At 104, execution time of the plurality of program tasks on one or more computing cores is estimated. Each program feature is mapped to an execution time estimate on a selected computing core. Predicting execution time of the program features involves training and fitting a mathematical model. In some embodiments, a linear model trained with offline training data sets can achieve this purpose. A linear model has the advantage of being simple to train and fast to evaluate at runtime. The most common way to fit a linear model is to use linear least squares regression, aiming to minimize the sum of the absolute errors in the prediction. However, negative and positive errors should be weighed differently for the purpose of meeting response-time requirements. Negative errors (under-prediction) lead to deadline misses that would impact user experience, while positive errors (over-prediction) result in an overly conservative frequency setting which does not save as much energy as possible. To maintain a good user experience, the training process should place greater weight on avoiding under-prediction as opposed to over-prediction.

Alternatively, in another example embodiment, a mathematical model can be trained with execution data generated at runtime. Online training enables the DVFS controller to adapt to run-time interference and run effectively on diverse platforms without off-line training.

At 106, resources for one or more computing cores based on the predicted execution time of the plurality of program features are controlled. From the mathematical model, the controller can determine the minimum frequency to satisfy a given time budget. The controller can further add a margin to the predicted execution time to account for inputs and program states. The resulting frequency is the exact frequency to satisfy the response-time requirements. Other resources that can be controlled by the disclosed technique include voltage, amount of memory, amount of cache space, interconnection bandwidth, or memory bandwidth.

The predicted execution times can also be used in a heterogeneous system to enable task migration from one computing core to another. The controller migrates a job that cannot meet its deadline on the little core to a big core based on the predicted execution time.

Figure 25:
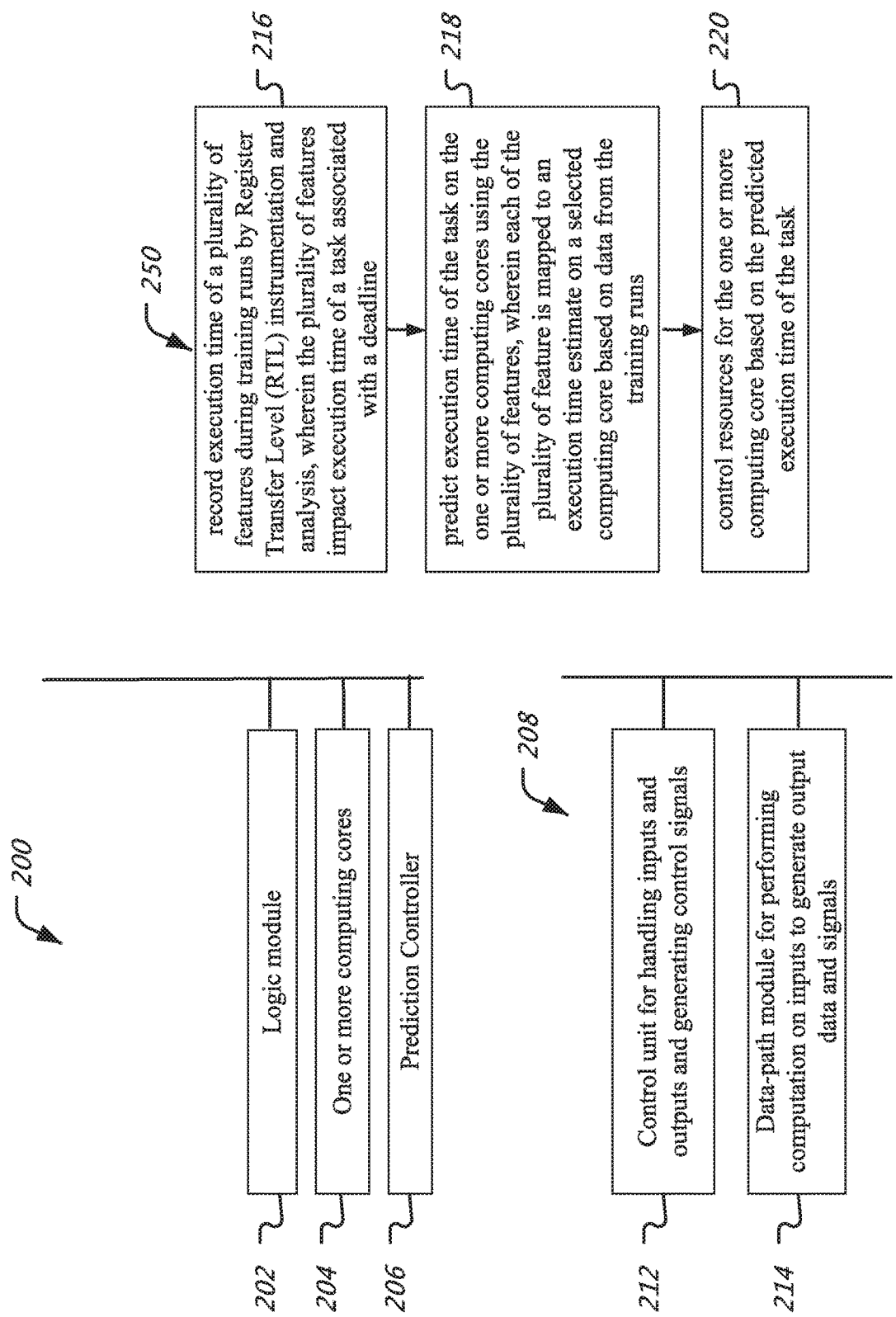
FIG. 25 shows a method flowchart and a block diagram representation of an controller apparatus for using prediction-guided resource allocation technologies for computer hardware systems.

FIG. 25 is a block diagram representation of an apparatus 200 using prediction-guided resource allocation technologies for computer hardware systems. The logic module 202 includes a control unit 212, comprising one or more finite state machines, for handling input requests and output responses and generating control signals, and a data-path module 214 for performing computation on input requests to generate output data and signals. The prediction controller 206 records execution time of a plurality of features during training runs by Register Transfer Level (RTL) instrumentation and analysis (216), wherein the plurality of features impact execution time of a task associated with a deadline. The prediction controller 206 also predicts execution time of the task on one or more computing cores 204 using the plurality of features, wherein each feature is mapped to an execution time estimate on a selected computing core based on data from the training runs (218). The prediction controller 206 further controls resources for one or more computing cores based on the predicted execution time of the plurality of features (220).

Evaluation

An Example Experimental Setup

In some experiments, the framework for prediction-based DVFS was applied to control a set of eight benchmark applications including three games, a web browser, speech recognition, a video decoder and two applications from the MiBench suite. Table 3 lists and describes these benchmarks. It also shows the minimum, average, and maximum job execution times for these benchmarks when run at maximum frequency.

TABLE 3

Benchmark descriptions and execution time statistics when running at maximum frequency

| Benchmark | Description | Task | Job Times [ms] | | |
|---|---|---|---|---|---|
| | | | Min | Avg | Max |
| 2048 [18] | Puzzle game | Update and render one turn | 0.52 | 1.2 | 2.1 |
| curseofwar [19] | Real-time strategy game | Updated and render one game loop iteration | 0.02 | 6.2 | 37.2 |
| ldecode [20] | H-264 decoder | Decode one frame | 6.2 | 20.4 | 32.5 |
| pocketspinx [21] | Speech recognition | Process one speech sample | 718 | 1661 | 2951 |
| rijndael [22] | Advanced Encryption Standard (AES) | Encrypt one piece of data | 14.2 | 28.5 | 43.6 |
| sha [22] | Secure Hash Algorithm (SHA) | Hash one piece of data | 4.7 | 25.3 | 46.0 |
| uzbl [23] | Web browser | Execute on command (e.g., refresh page) | 0.04 | 2.2 | 35.5 |
| xpilot [24] | 2D space game | Update and render one game loop iteration | 0.2 | 1.3 | 3.1 |

Some experiments were implemented on an ODROID-XU3 development board running Ubuntu 14.04. The ODROID-XU3 includes a Samsung Exynos5422 SoC with ARM Cortex-A15 and Cortex-A7 cores. The present document discloses results here for running on the more power-efficient A7 core but similar trends can be seen when running on the A15 core. In order to isolate measurements for the application of interest, some embodiments pinned the benchmark to run on the A7 core while using the A15 to run OS and background jobs. These embodiments measured power using the on-board power sensors with a sampling rate of 213 samples per second and integrated over time to calculate energy usage.

The disclosed prediction-based DVFS controller can be compared with existing controllers and previously proposed control schemes. Specifically, embodiments can measure results for the following DVFS schemes:

1. Performance: The Linux performance governor always runs at the maximum frequency. The energy results can be normalized to this case.

2. Interactive: The Linux interactive governor was designed for interactive mobile applications. It samples CPU utilization every 80 milliseconds and changes to maximum frequency if CPU utilization is above 85%.

3. PID: The PID-based controller uses previous prediction errors with a PID control algorithm in order to predict the execution time of the next job. The PID parameters are trained offline and are optimized to reduce deadline misses.

4. Prediction: The prediction-based controller is described throughout the present document.

Energy Savings and Deadline Misses

Figure 26:
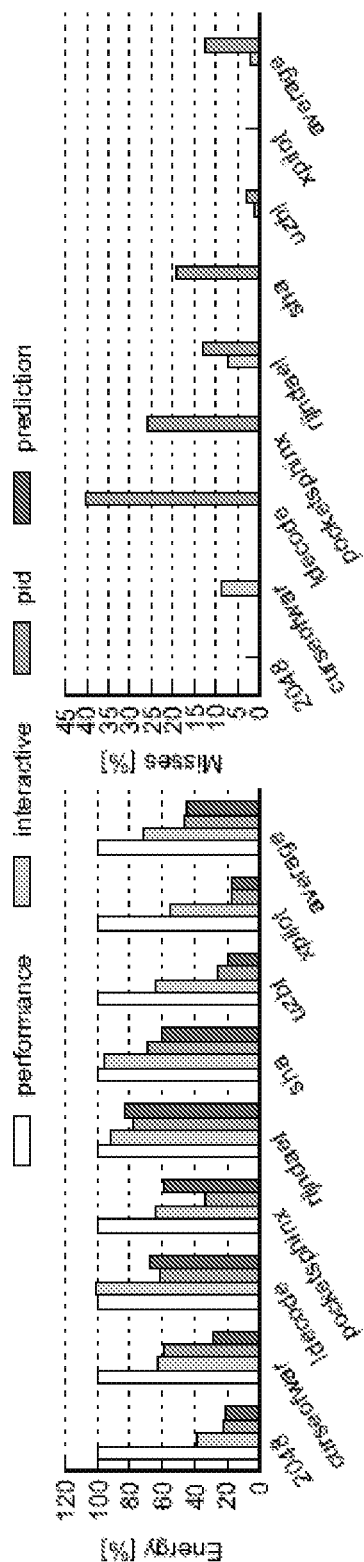
FIG. 26 shows an example of normalized energy usage and deadline misses.

FIG. 26 compares energy consumption and deadline misses for the different DVFS controllers across the benchmark set. These experiments are run with a time budget of 50 ms per job as running faster than this is not noticeable to a user. pocketsphinx takes at least 100 s of milliseconds to run (see Table 3) so a 4 second deadline was used. This corresponds to the time limit that a user is willing to wait for a response. Energy numbers are normalized to the energy usage of the performance governor. Deadline misses are reported as the percentage of jobs that miss their deadline. It can be seen that, on average, the disclosed prediction-based controller saves 56% energy compared to running at max frequency. This is 27% more savings than the interactive governor and 1% more savings than the PID-based controller. For ldecode, pocketsphinx, and rijndael, prediction-based control shows higher energy consumption than PID-based control. However, if one looks at deadline misses, it can be seen that PID-based control shows a large number of misses for these benchmarks. On average, the interactive governor shows 2% deadline misses and the PID-based controller shows 13% misses. In contrast, the disclosed prediction-based controller shows 0.1% deadline misses for curseofwar and no deadline misses for the other benchmarks tested. Overall, it can be seen that the interactive governor has a low number of deadline misses, but achieves this with high energy consumption. On the other hand, PID-based control shows lower energy usage than the prediction-based controller in some cases, but this comes at the cost of a large number of deadline misses. Instead, on average, the disclosed prediction-based control is able to achieve both better energy consumption and less deadline misses than the interactive governor and PID-based control.

Figure 27:
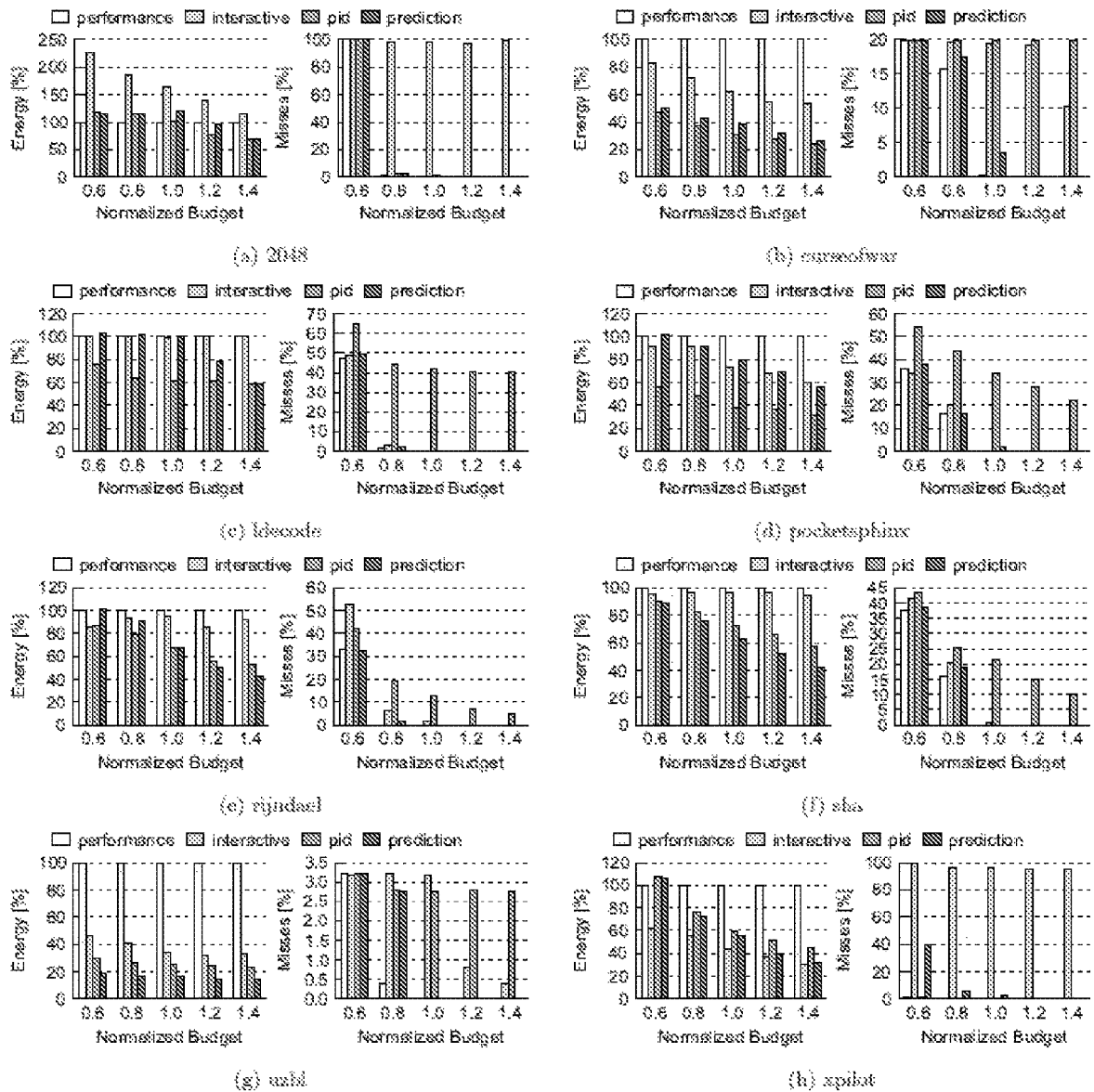
FIG. 27 shows an example of normalized energy usage and deadline misses as time budget varies

Since the disclosed prediction-based controller takes the time budget into account, it is able to save more energy with longer time budgets. Similarly, with shorter time budgets, it will spend more energy to attempt to meet the tighter deadlines. In order to study this trade-off, the time budget was swept around the point where an implementation can expect to start seeing deadline misses. Specifically, one can set a normalized budget of 1 to correspond to the maximum execution time seen for the task when running at maximum frequency (see Table 3). This corresponds to the tightest budget such that all jobs are able to meet their deadline. FIG. 27 shows the energy usage and deadline misses for the various benchmarks as the normalized budget is swept below and above 1. One can see that the disclosed prediction-based controller is able to save more energy with longer time budgets and continues to outperform the interactive governor and the PID-based controller for varying time budgets. For normalized budgets less than 1, the disclosed prediction-based controller shows deadline misses. However, the number of misses is typically close to the number seen with the performance governor. This implies that the only deadline misses are the ones that are impossible to meet at the specified time budget, even with running at the maximum frequency.

Heterogeneous Cores

Figure 34:
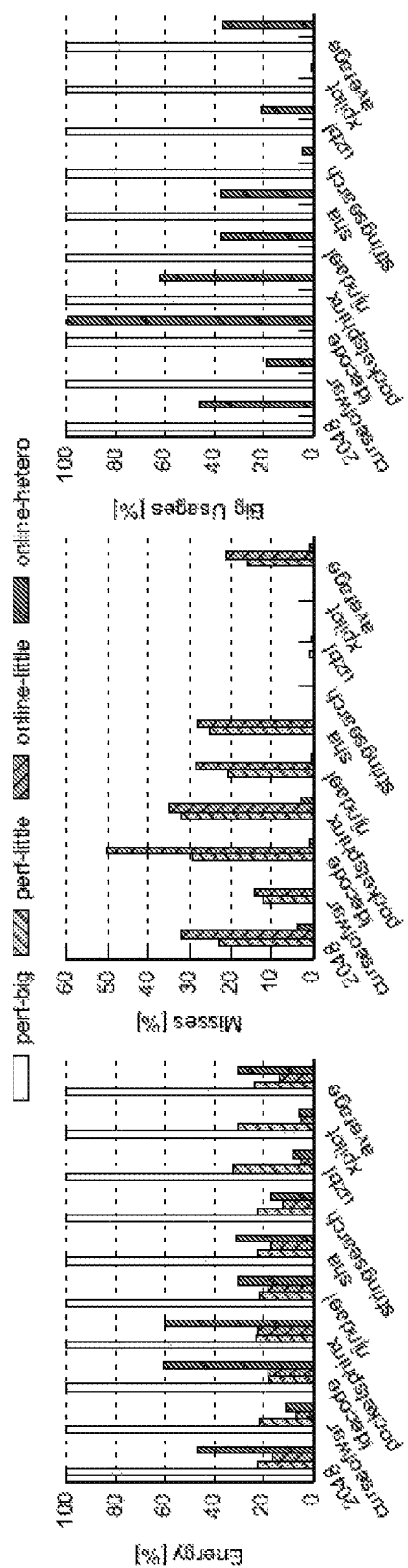
FIG. 34 shows an example of normalized energy usage, deadline misses, and big core usages with heterogeneous cores.

FIG. 34 shows the experimental results when both A7 and A15 cores are used. In this case, the prediction-guided controller can migrate a job between the two types of cores. For these experiments, in order to study cases where the A7 core is not enough to meet deadlines, the time budget was reduced by 40% so that the A7 can only meet the deadline for a subset of jobs. As a result, even the performance governor running at the highest frequency experiences many deadline misses when a benchmark only runs on the little core (perf-little). Similarly, the on-line training scheme on the little core (online-little) results in many deadline misses.

On the other hand, the on-line training scheme using both cores can effectively remove almost all deadline misses by selectively using the big core when necessary. Because the power consumption of the big core is significantly higher than that of the little core, the heterogeneous core configuration consumes 6.5% and 16.9% more energy compared to the performance governor and the on-line training on a little core. However, because the prediction-guided controller still uses the little core when it is fast enough to meet deadlines, the on-line training scheme on heterogeneous cores still consumes significantly (69.8%) less energy compared to the performance governor on the big core.

Prediction Accuracy

No Interference

Figure 35:
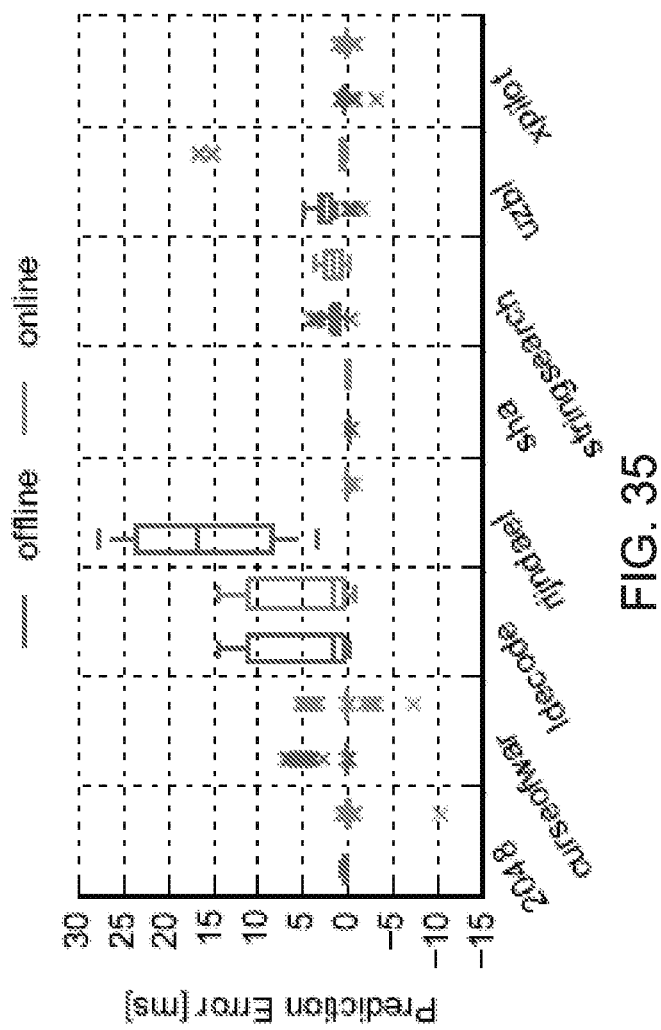
FIG. 35 shows an example of prediction errors for off-line and on-line training without interference.

FIG. 35 shows the prediction error when there is no interference. In box-and-whisker plots, the box represents the first and third quartiles and the line in the box marks the median value. Outliers (values over 1.5 times the inner quartile range past the closest box end) are marked with an "x" and the non-outlier range is marked by the whiskers. Due to heavier under-prediction penalty, the prediction skews toward over-prediction with average errors higher than 0. For both off-line and on-line training, one can see prediction errors of less than 5 ms, which is only 10% of a 50 ms time budget. ldecode shows higher prediction errors, which limits energy savings. pocketsphinx (not shown) has errors ranging from 40 ms to 1500 ms of over-prediction with an average of 960 ms over-prediction. Although these errors are larger in absolute terms than the other benchmarks, they are on the same order of magnitude when compared to the execution time of pocketsphinx jobs (4s). Overall, the results suggest that the on-line training scheme has a comparable or lower error rate compared to the off-line scheme.

With Interference

Figure 36:
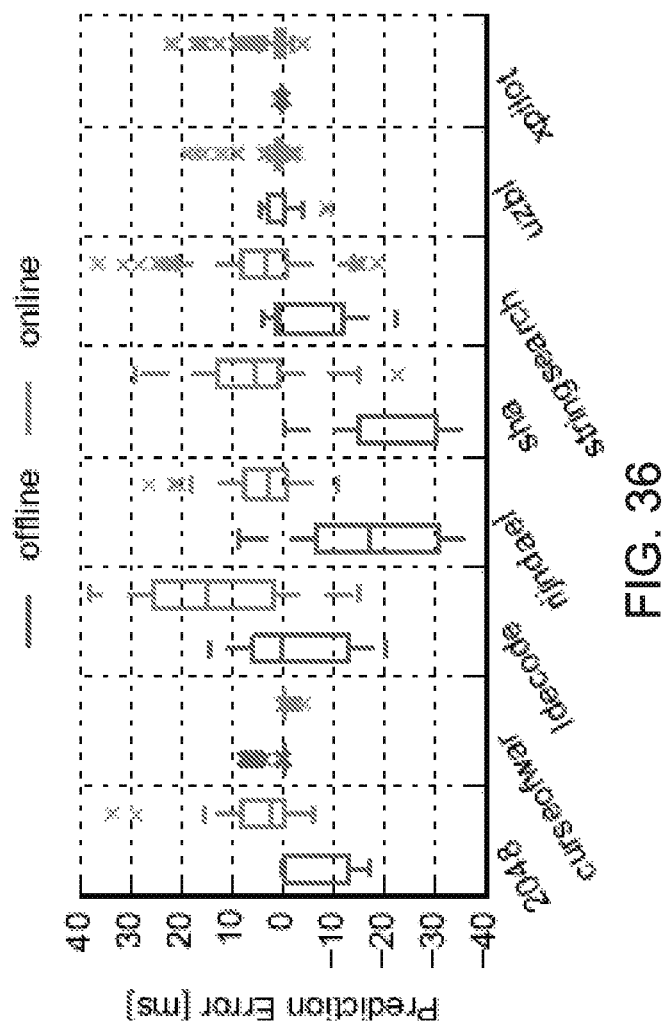
FIG. 36 shows an example of prediction errors for off-line and on-line training during interference.

FIG. 36 shows the prediction errors when there is interference. Although the error range of some benchmarks increases due to the interference, the on-line training scheme can still provide mostly conservative execution time prediction. On the other hand, the off-line training scheme significantly under-predicts the execution time for most benchmarks, leading to deadline misses.

Multiple Platforms

Figure 37:
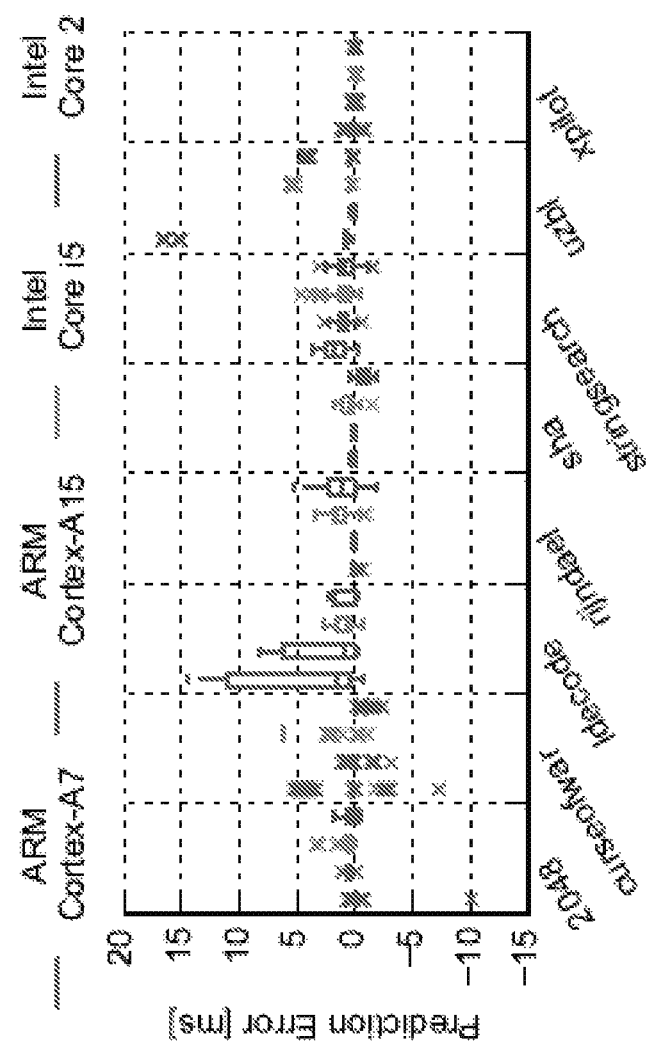
FIG. 37 shows an example of prediction errors on different processors.

FIG. 37 shows the prediction errors for the on-line training scheme on multiple processors. Here, the same control features are used for all cases, while the model itself is trained on each core at run-time. The results show that the disclosed execution time prediction model with on-line training can provide fairly accurate estimates across a range of different hardware platforms. In most cases, the prediction error is less than 5 ms, which is less than 10% of a typical time budget. Moreover, most errors come from over-predictions, which do not lead to deadline misses. The results suggest that the disclosed prediction model can be easily ported to many platforms without explicit off-line training.

Analysis of Overheads and Error

Figure 28:
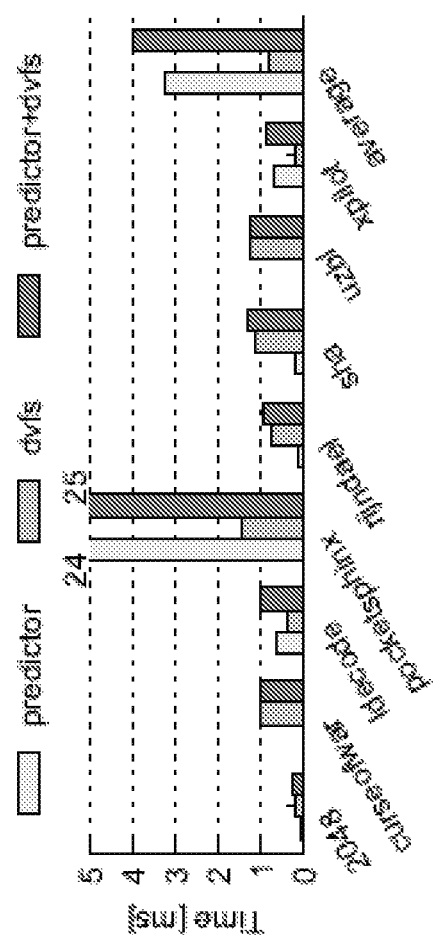
FIG. 28 shows an example of average time to run prediction slice and switch DVFS levels.
Figure 29:
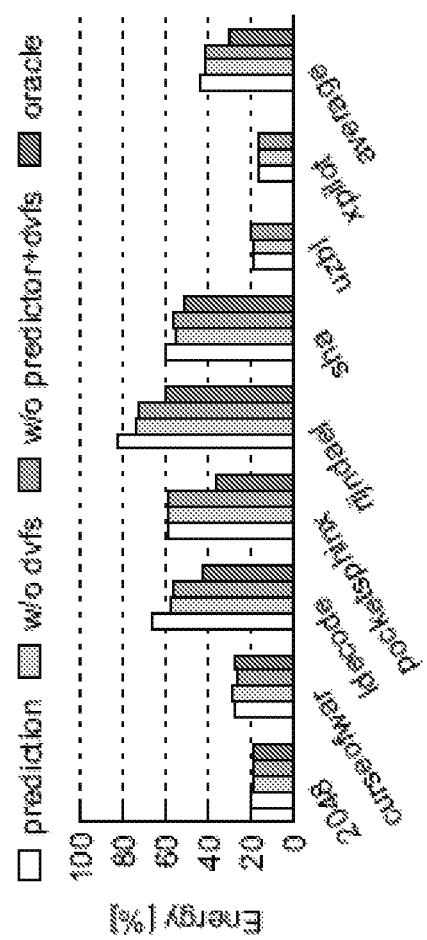
FIG. 29 shows an example of normalized energy usage and deadline misses with overheads removed and oracle predictions.

FIG. 28 shows the average times for executing the predictor and for switching DVFS levels. On average, the predictor takes 3.2 ms to execute and DVFS switching takes 0.8 ms. Excluding pocketsphinx, the average total overhead is less than 1 ms which is 2% of a 50 ms time budget. pocketsphinx shows a long execution time for the predictor. However, this time is negligible compared to the execution time of pocketsphinx jobs which are on the order of seconds. The overheads of executing the predictor and DVFS switching decrease the energy savings achievable. This is due to the energy consumed to perform these operations as well as the decrease in effective budget. Better program slicing and/or feature selection could reduce the predictor execution time. Similarly, faster DVFS switching circuits have shown switching times on the order of tens of nanoseconds. In order to explore the limits of what is achievable, the disclosed prediction-based control was analyzed when the overheads of the predictor and DVFS switching are ignored. FIG. 29 shows the energy and deadline misses when these overheads are removed. These results are shown for a time budget of 4 s for pocketsphinx and 50 ms for all other benchmarks. On average, one can see a 3% decrease in energy consumption when removing the overheads of DVFS switching. Removing the overhead of running the predictor shows negligible improvement past removing the DVFS switching overhead.

Figure 30:
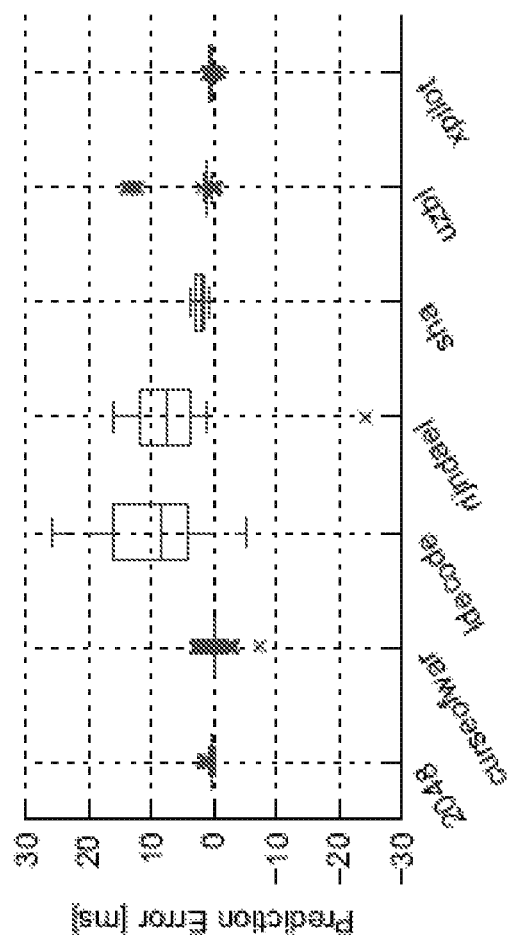
FIG. 30 shows exemplary box-and-whisker plots of prediction errors.

In addition to these overheads, the accuracy of the disclosed prediction limits the effectiveness of the prediction-based controller. FIG. 30 shows box-and-whisker plots of the prediction error. The box indicates the first and third quartiles and the line in the box marks the median value. Outliers (values over 1.5 times the inner quartile range past the closest box end) are marked with an "x" and the non-outlier range is marked by the whiskers. Positive values represent over-prediction and negative-numbers represent under-prediction. One can see that the prediction skews toward over-prediction with average errors greater than 0. Most benchmarks show prediction errors of less than 5 ms, which is only 10% of a 50 ms time budget. ldecode and rijndael show higher prediction errors, which limits the energy savings possible. pocketsphinx (not shown) has errors ranging from 60 ms under-prediction to 2 seconds over-prediction with an average of 880 ms over-prediction. Although these errors are larger in absolute terms than the other benchmarks, they are on the same order of magnitude when compared to the execution time of pocketsphinx jobs.

In order to explore the possible improvements with perfect prediction, some embodiments implemented an "oracle" controller that uses recorded job times from a previous run with the same inputs to predict the execution time of jobs. FIG. 29 also includes these oracle results. It can be seen than an additional 11% energy savings are achievable with oracle on top of removing the predictor and DVFS switching overheads.

Under-Prediction Trade-Off

Figure 31:
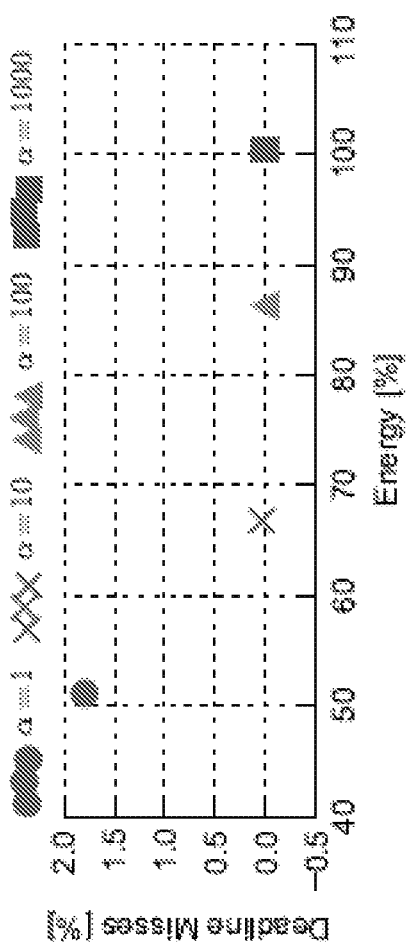
FIG. 31 shows an example of energy vs. deadline misses for various under-predict penalty weights for ldecode.

Placing greater penalty on under-prediction increases the energy usage but reduces the likelihood of deadline misses. FIG. 31 shows the energy and deadline misses for varying under-predict penalty weights for ldecode. It can be seen that as the weight is decreased, energy consumption decreases but deadline misses increase. Reducing the weight from 1000 to 100 keep misses at 0, but reducing the weight to 10 introduces a small number of deadline misses (0.03%). Other benchmarks show similar trends and across the benchmarks, an under-predict penalty weight of 100 provided good energy savings without sacrificing deadline misses.

On-Line Training Sensitivity Studies

Figure 32:
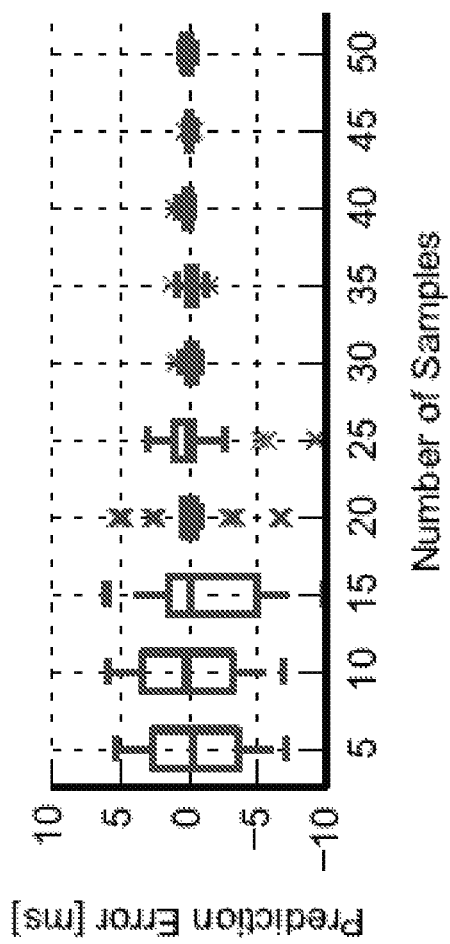
FIG. 32 shows an example of prediction errors as the number of samples for training varies.

FIG. 32 shows how the accuracy of the model changes as the number of samples to train the model is varied for the 2048 game. The results show that the model becomes more accurate with the increasing number of samples, but the benefit is minimal after 30 to 35 samples. The trend is the same of other benchmarks, and a few tens of samples are sufficient for most benchmarks.

Figure 33:
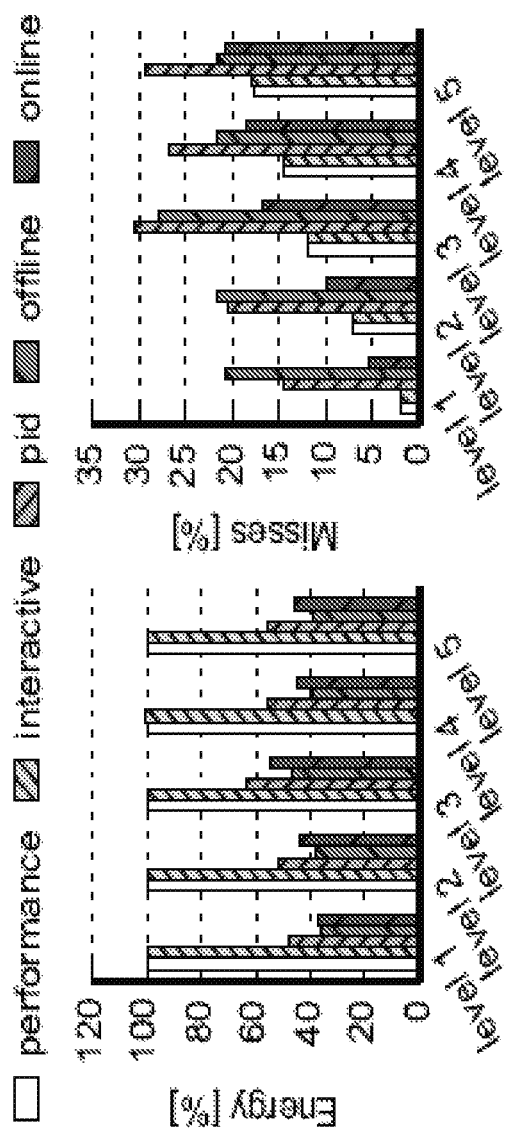
FIG. 33 shows an example of normalized energy usage and deadline misses as the intensity level of interference varies.

FIG. 33 shows how the energy savings and deadline misses vary as the intensity level of interference increases. The result shows the average across all the benchmarks. Here, the intensity is increased by adding more dummy applications. As expected, one can see that the number of deadline misses for all the controllers increases as the intensity level gets higher, but the on-line training scheme can still save energy with a small increase in deadline misses compared to the performance governor.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed are techniques and structures as described and shown, including:

1. A computer-implemented method of using prediction-guided resource allocation technologies to improve energy efficiency while meeting a response-time requirement for software applications, comprising:
    generating a plurality of program features that impact execution time of a plurality of program tasks;
    predicting an execution time for each of the plurality of program tasks on one or more computing cores using the plurality of program features, wherein each of the plurality of program features is mapped to an execution time estimate on a selected computing core;
    controlling resources for the one or more computing cores based on the predicted execution time for the plurality of program tasks; and
    training and fitting a mathematical model to map the plurality of program features to the execution time estimates, wherein the training and fitting the mathematical model places more weight on avoiding exceeding a time budget of the plurality of program tasks than on conserving energy usage by a corresponding computing core.

2. The method of claim 1, further comprising:
    instrumenting source code of the plurality of program tasks for identifying values of the plurality of program features; and
    producing code fragments that, when executed, compute the values of the plurality of program features, wherein the code fragments compute the values of the plurality of program features faster than the source code.

3. The method of claim 1, wherein the training and fitting the mathematical model is conducted offline by feeding a set of training data consisting of the plurality of program features and corresponding execution times to the mathematical model.

4. The method of claim 1, wherein the training and fitting the mathematical model further comprises:
    feeding the plurality of program features and corresponding execution times at runtime to the mathematical model;
    monitoring an error margin to ensure that the mathematical model reaches stability to provide accurate predictions.

5. The method of claim 4, wherein the training and fitting the mathematical model further comprises:
    detecting runtime changes to retrain the mathematical model or to switch to a second mathematical model.

6. The method of claim 1, further comprising:
    switching, when the predicted execution time of a subset of the plurality of program tasks exceeds a time budget on a first computing core running at its maximal frequency, the subset of the plurality of program tasks to a second computing core that is different from the first computing core.

7. The method of claim 1, further comprising:
    switching a subset of the plurality of program tasks to a second computing core that is different from a first computing core when a first estimated power consumption of the subset of the plurality of program tasks on the first computing core exceeds a second estimated power consumption of the subset of the plurality of program tasks on the second computing core, wherein the predicted execution time of the subset of the plurality of program tasks is within the time budget on the first computing core running at its maximal frequency.

8. The method of claim 1, wherein the resources include a clock frequency, a voltage, an amount of memory, an amount of cache space, an interconnection bandwidth, or a memory bandwidth.

9. A computer program product comprising a computer-readable non-transitory program medium having code stored thereon, the code, when executed, causing a processor to implement a method of using prediction-guided resource allocation technologies to improve energy efficiency while meeting response-time requirement for software applications, the method comprising:
    generating a plurality of program features that impact execution time of a plurality of program tasks;
    predicting an execution time for each of the plurality of program tasks on one or more computing cores using the plurality of program features, wherein each of the plurality of program features is mapped to an execution time estimate on a selected computing core; and
    controlling resources for the one or more computing cores based on the predicted execution time for the plurality of program tasks; and
    training and fitting a mathematical model to map the plurality of program features to the execution time estimates, wherein the training and fitting the mathematical model places more weight on avoiding exceeding a time budget of the plurality of program tasks than on conserving energy usage by a corresponding computing core.

10. The computer program product of claim 9, wherein the method further comprises:
    instrumenting source code of the plurality of program tasks for identifying values of the plurality of program features; and
    producing code fragments that, when executed, compute the values of the plurality of program features, wherein the code fragments compute the values of the plurality of program features faster than the source code.

11. The computer program product of claim 9, wherein the training and fitting the mathematical model is conducted offline by feeding a set of training data consisting of the plurality of program features and corresponding execution times to the mathematical model.

12. The computer program product of claim 9, wherein the training and fitting the mathematical model further comprises:
 feeding the plurality of program features and corresponding execution times at runtime to the mathematical model; and
 monitoring an error margin to ensure that the mathematical model reaches stability to provide accurate predictions.

13. The computer program product of claim 9, wherein the training and fitting the mathematical model further comprises:
 detecting runtime changes to retrain the mathematical model or to switch to a second mathematical model.

14. The computer program product of claim 9, wherein the method further comprises:
 switching, when the predicted execution time of a subset of the plurality of program tasks exceeds a time budget on a first computing core running at its maximal frequency, the subset of the plurality of program tasks to a second computing core that is different from the first computing core.

15. The computer program product of claim 9, wherein the method further comprises:
 switching a subset of the plurality of program tasks to a second computing core that is different from a first computing core when a first estimated power consumption of the subset of the plurality of program tasks on the first computing core exceeds a second estimated power consumption of the subset of the plurality of program tasks on the second computing core, wherein the predicted execution time of the subset of the plurality of program tasks are within a time budget on the first computing core running at its maximal frequency.

16. The computer program product of claim 9, wherein the resources include a clock frequency, a voltage, an amount of memory, an amount of cache space, an interconnection bandwidth, or a memory bandwidth.

17. An apparatus using prediction-guided resource allocation technologies to improve energy efficiency while meeting response-time requirement for computer hardware systems, comprising:
 a logic module including a control unit comprising one or more finite state machines (FSMs) for handling input requests, output responses, and generating control signals, and a data-path module for performing computations on input requests to generate output data and signals;
 one or more computing cores;
 a prediction controller that 1) records execution time of a plurality of features during training runs by Register Transfer Level (RTL) instrumentation and analysis, wherein the plurality of features impact an execution time of a task associated with a deadline; 2) predicts execution time of the task on the one or more computing cores using the plurality of features, wherein each of the plurality of features is mapped to an execution time estimate on a selected computing core based on data from the training runs; and 3) controls resources for the one or more computing cores based on the predicted execution time for the task; and
 training and fitting a mathematical model to map the plurality of program features to the execution time estimates, wherein the training and fitting the mathematical model places more weight on avoiding exceeding a time budget of the plurality of program tasks than on conserving energy usage by a corresponding computing core.

18. The apparatus of claim 17, wherein the training and fitting the mathematical model is conducted offline by feeding the mathematical model with data from the training runs consisting of the plurality of features and corresponding execution times.

19. The apparatus of claim 17, wherein the training and fitting the mathematical model further comprises:
 feeding the plurality of features and corresponding execution times at runtime to the mathematical model; and
 monitoring an error margin to ensure that the mathematical model reaches stability to provide accurate predictions.

20. The apparatus of claim 17, wherein the resources include a clock frequency, a voltage, an amount of memory, an amount of cache space, an interconnection bandwidth, or a memory bandwidth.

21. The apparatus of claim 17, wherein the prediction controller switches the task to a second computing core, different from a first computing core, when the predicted execution time of the task will miss the deadline on a first computing core running at its maximal frequency.

* * * * *